United States Patent [19]

Fischer

[11] Patent Number: 4,941,089

[45] Date of Patent: Jul. 10, 1990

[54] INPUT/OUTPUT NETWORK FOR COMPUTER SYSTEM

[75] Inventor: Michael A. Fischer, San Antonio, Tex.

[73] Assignee: Datapoint Corporation, San Antonio, Tex.

[21] Appl. No.: 941,084

[22] Filed: Dec. 12, 1986

[51] Int. Cl.⁵ .............................................. G06F 13/38
[52] U.S. Cl. ................................ 364/200; 370/85.13; 370/94.1
[58] Field of Search ............... 371/32, 33; 340/825.06, 340/825.07, 825.08, 825.5, 825.54; 370/60, 13-17, 85, 94, 946, 85.1, 85.9, 85.13, 94.1, 94.2, 99, 85.4

[56] References Cited

U.S. PATENT DOCUMENTS

| | | | |
|---|---|---|---|
| 4,423,414 | 12/1983 | Bryant et al. | 340/825.52 X |
| 4,495,493 | 1/1985 | Segarra et al. | 340/825.05 X |
| 4,549,297 | 10/1985 | Nishimoto | 371/33 |
| 4,574,284 | 3/1986 | Feldman et al. | 370/86 X |
| 4,680,581 | 7/1987 | Kozlik et al. | 340/825.5 X |
| 4,692,918 | 9/1987 | Elliott et al. | 370/85 |
| 4,706,080 | 11/1987 | Sincoskie | 340/825.02 |

Primary Examiner—David L. Clark
Attorney, Agent, or Firm—John R. Ley

[57] ABSTRACT

An I/O network channel achieves relatively high rates of data communication between a plurality of widely physically dispersed devices interconnected by a LAN-type media. A processor connected to each node of the media controls the data and functions of a receiver and transmitter at each node to establish network level, transport level and session level data communication and control functions.

30 Claims, 13 Drawing Sheets

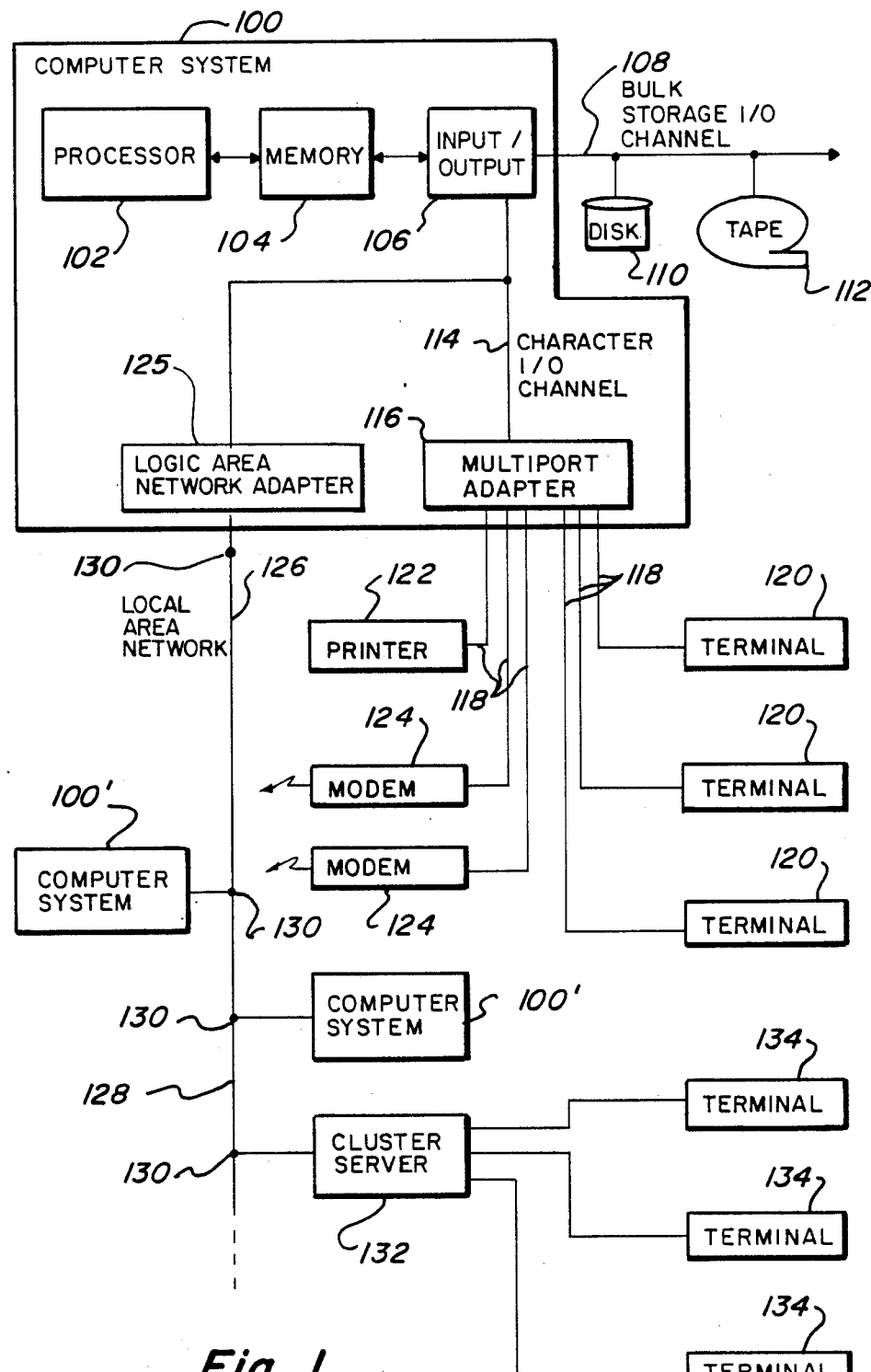
Fig_1
PRIOR ART

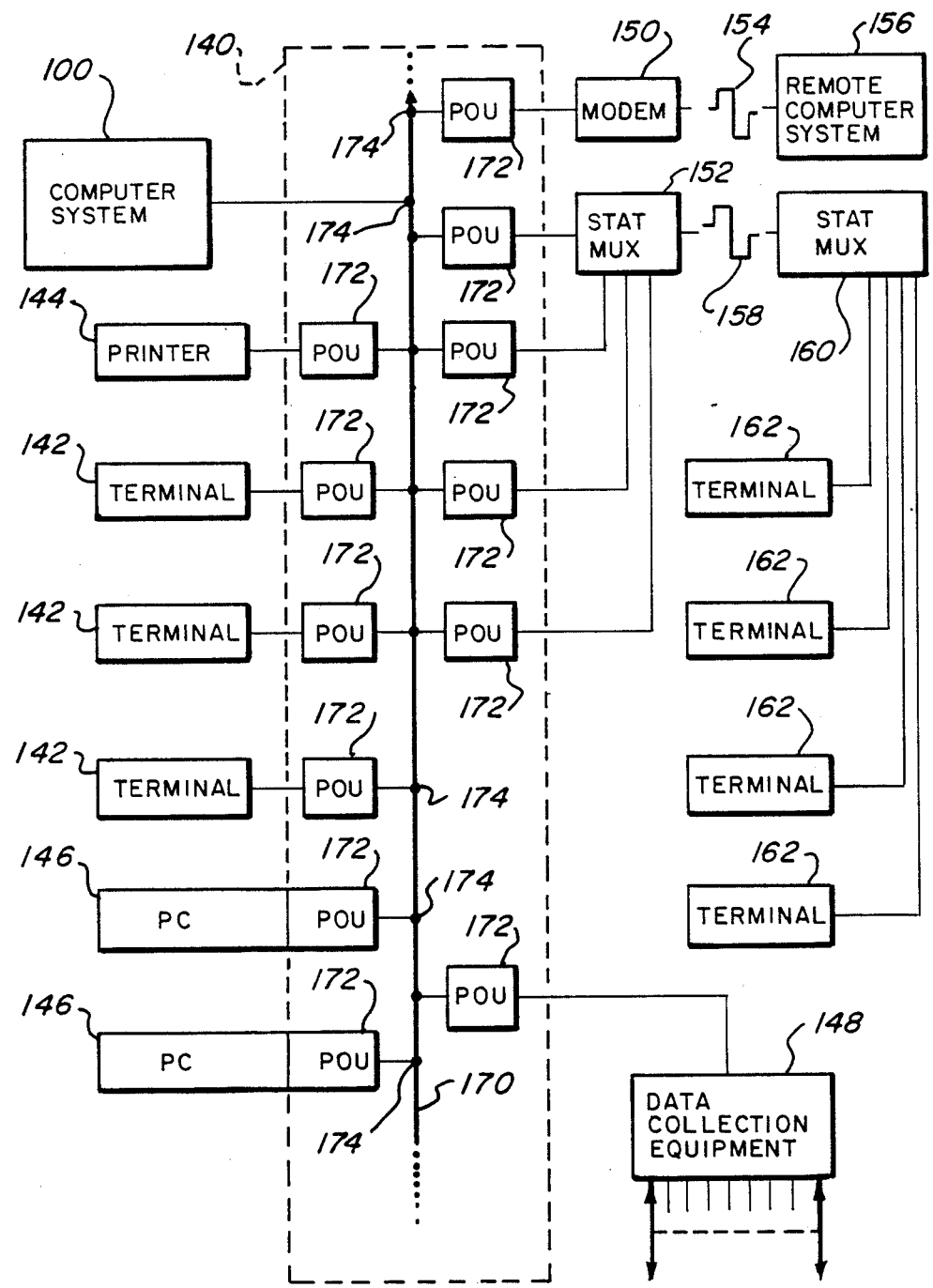
Fig_2

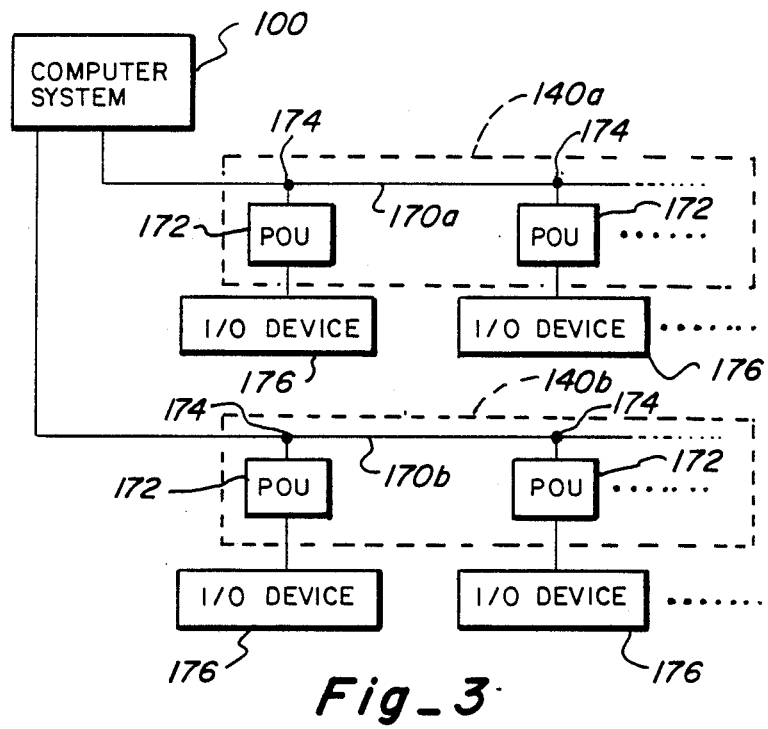
Fig_3
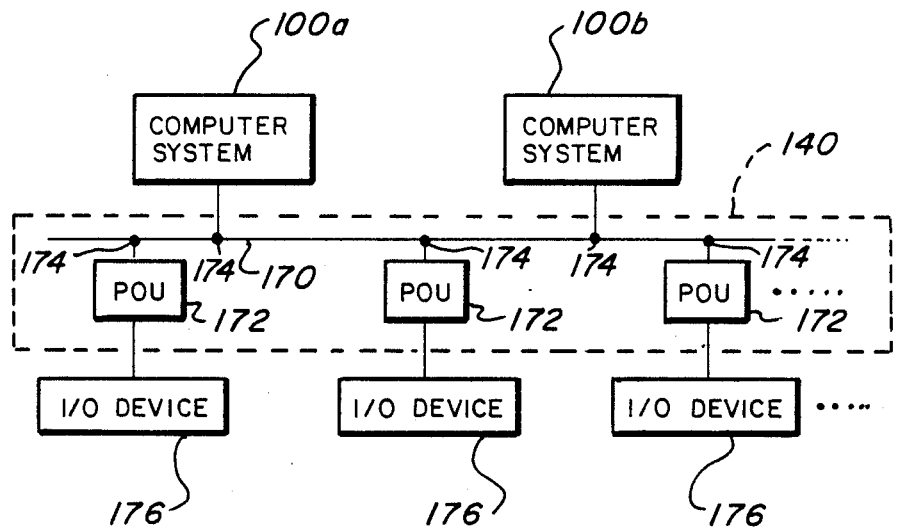
Fig_4

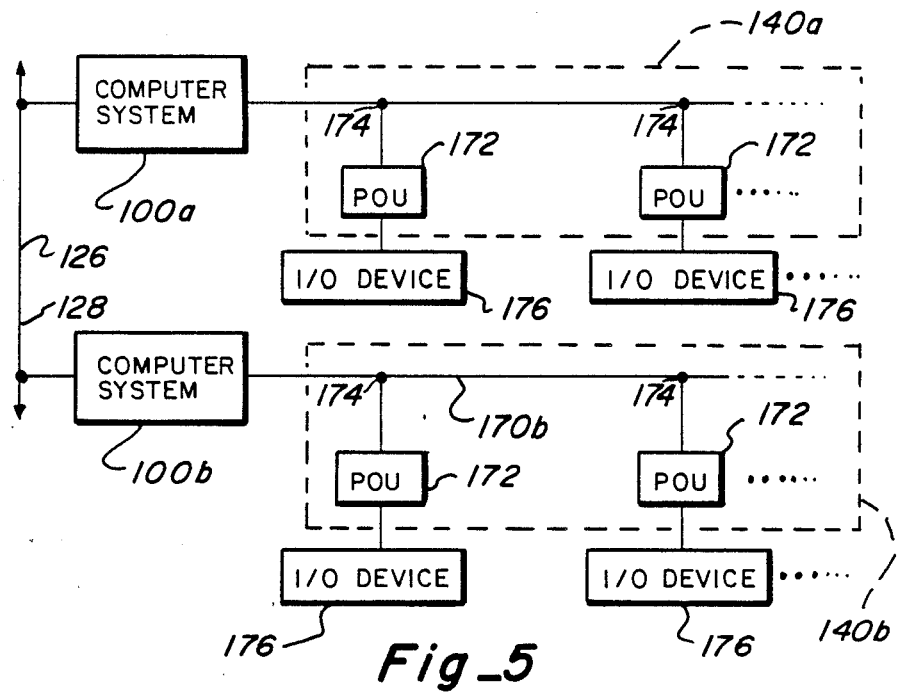
Fig_5
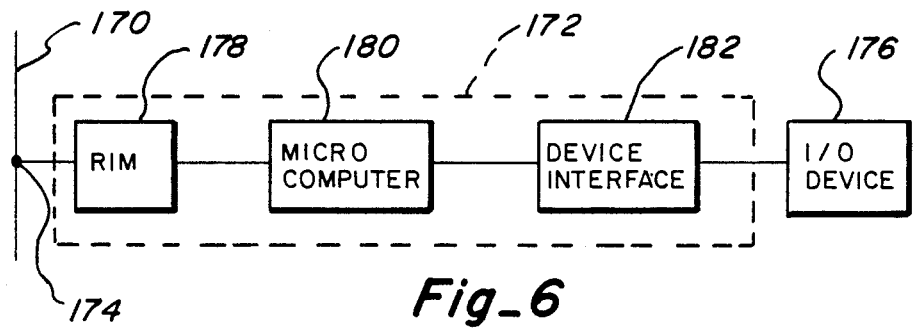
Fig_6
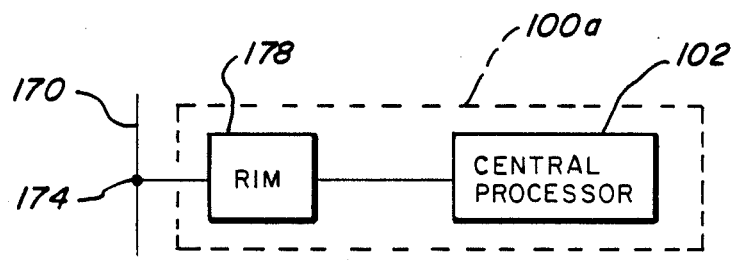
Fig_7

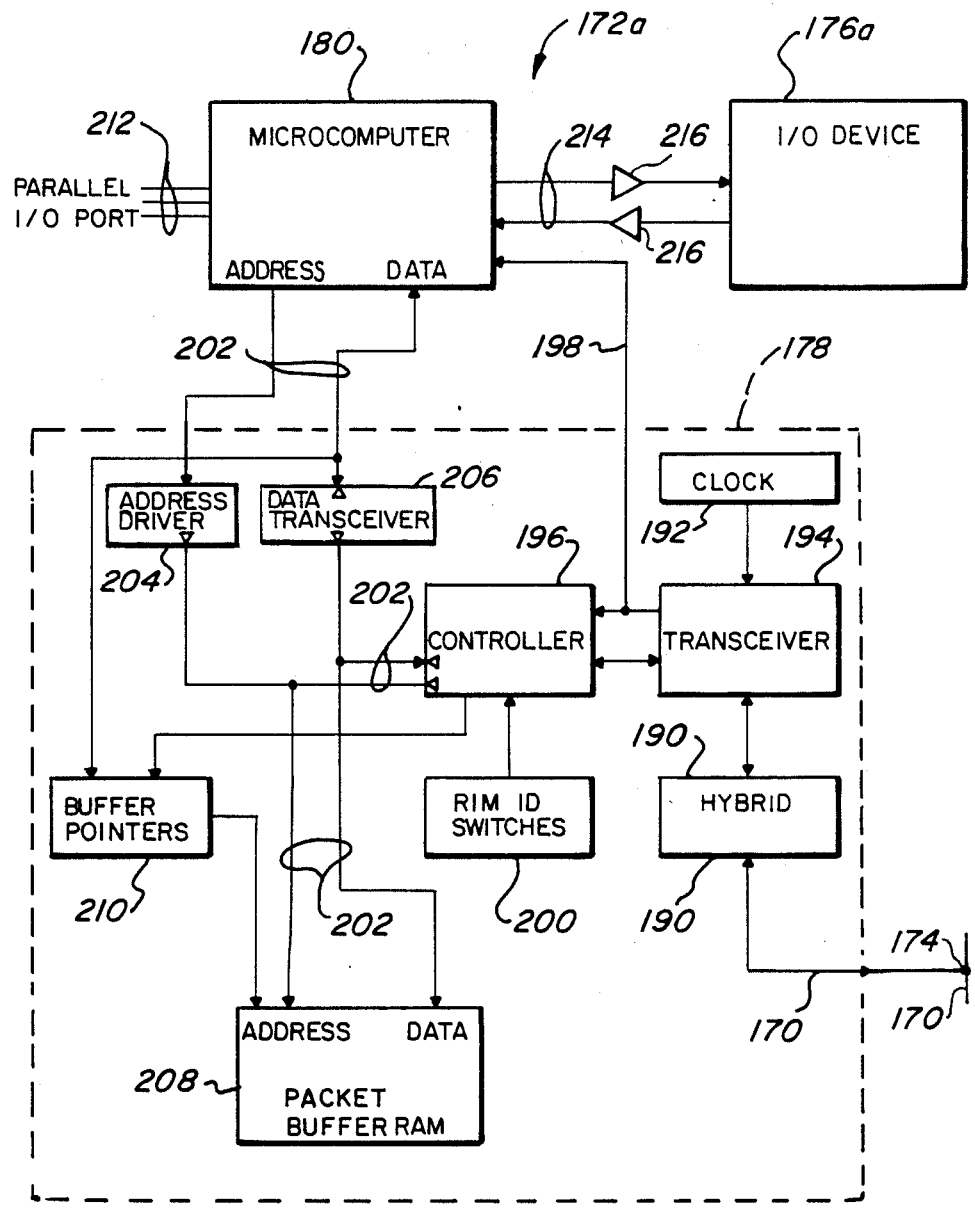
Fig_8

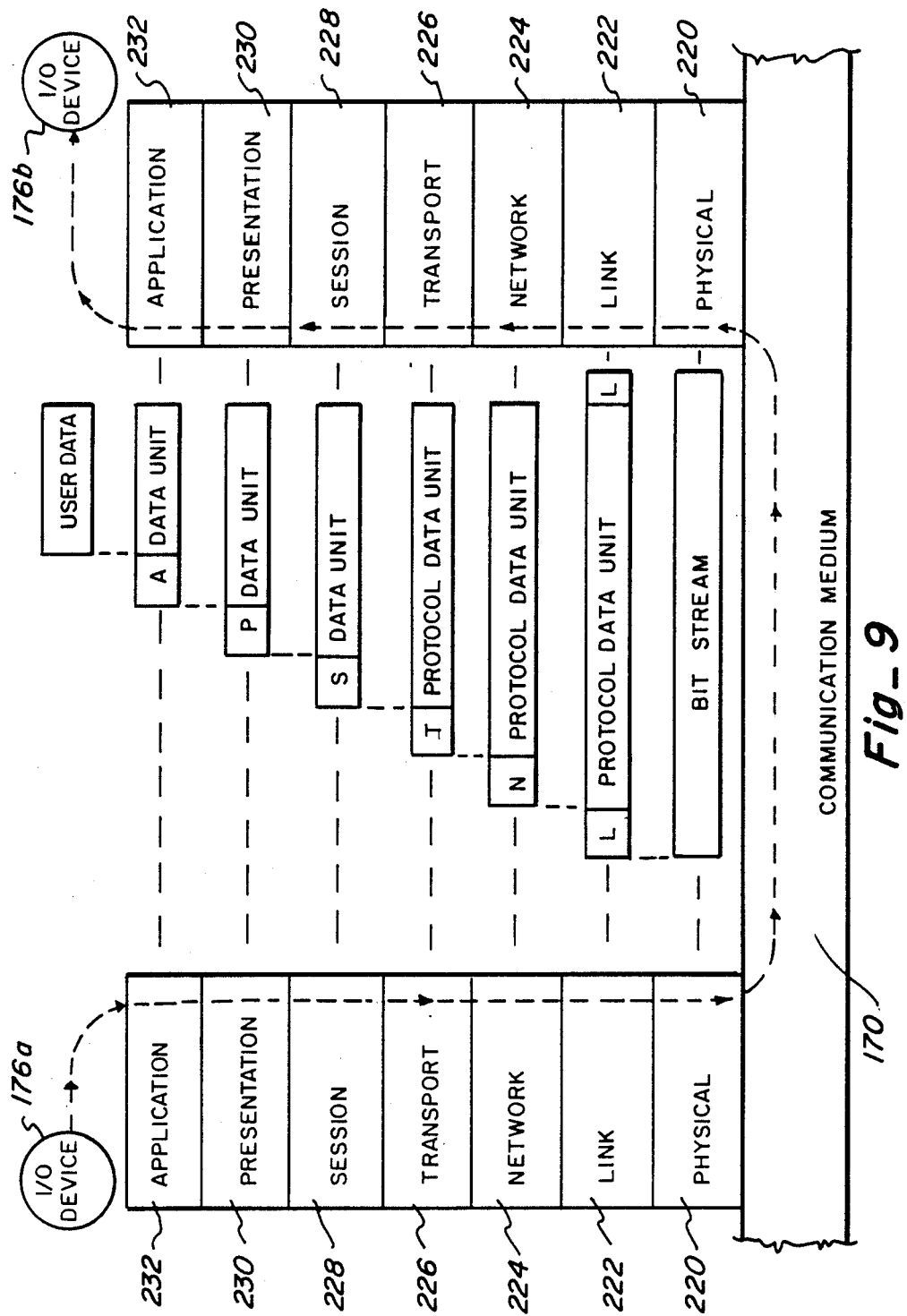
Fig_9

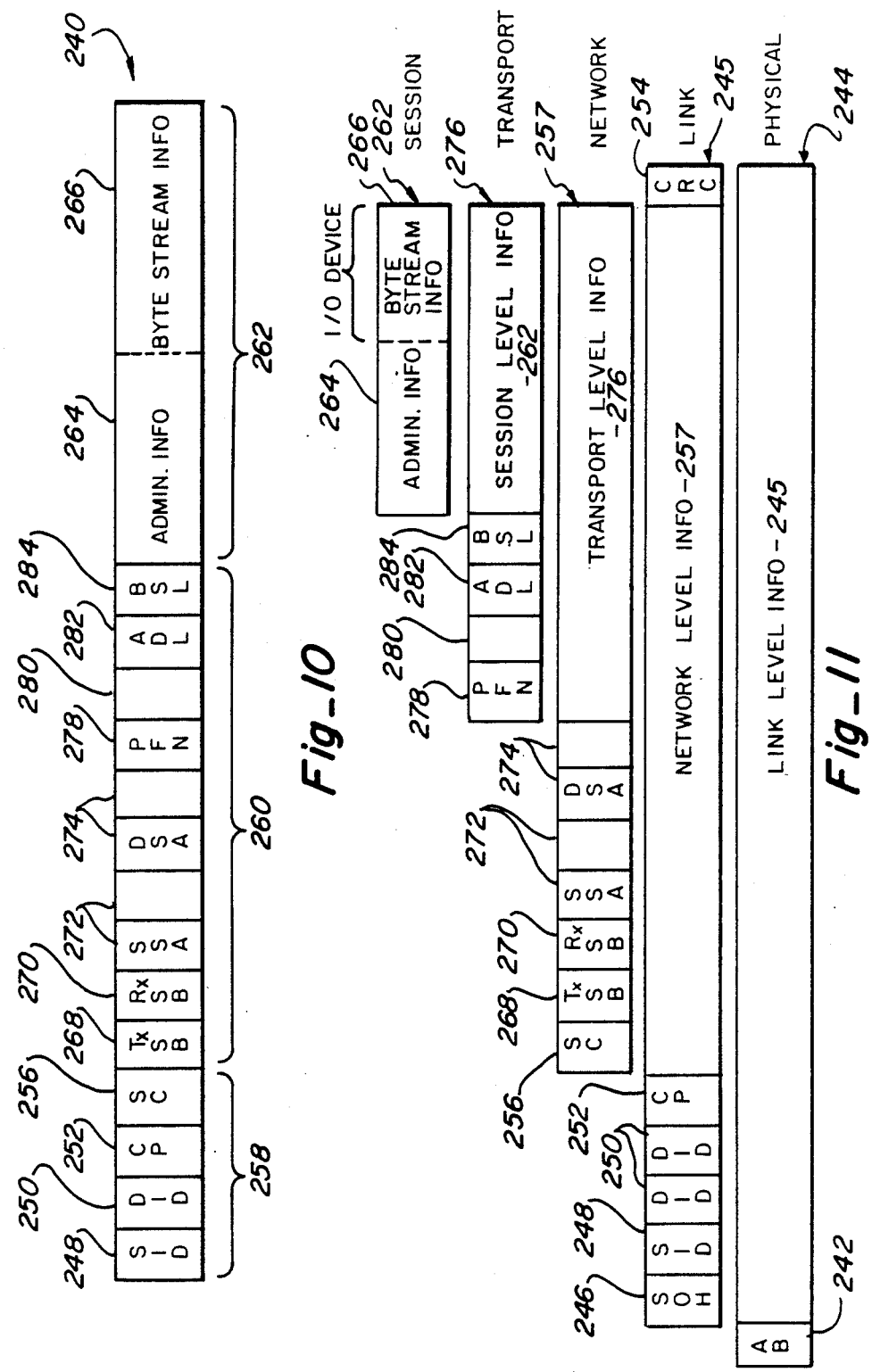
Fig_10
Fig_11

| REF NO. | NAME | LAYOUT | USAGE |
|---|---|---|---|
| 248 | SID | ARCNET ADDRESS | PHYSICAL SOURCE ADDRESS |
| 250 | DID | ARCNET ADDRESS | PHYSICAL DESTINATION ADDRESS |
| 252 | CP | VALUE | ENCODED PACKET LENGTH |
| 256 | SYSCODE (SC) | 0 0 0 1 0 0 0 1 | PACKET TYPE (FOR IONET) |
| 268 | TXSB | Imm \| OPERATION \| SEQ.NO. OR FUNCTION | TRANSMITTER STATUS |
| 270 | RXSB | Imm \| ACK \| FAULT \| SEQ. NO. | RECEIVER STATUS |
| 272 | SSA | LOW 8 BITS OF VALUE | SOURCE SUBADDRESS |
| 272 | | 0 0 0 0 \| HIGH 4 BITS OF VALUE | |
| 274 | DSA | LOW 8 BITS OF VALUE | DESTINATION SUBADDRESS |
| 274 | | 0 0 0 0 \| HIGH 4 BITS OF VALUE | |
| 278 | PFN | TYPE \| BIT 8 BSLNG \| BIT 8 ADLNG \| FUNCTION CODE | PACKET FUNCTION |
| 280 | | 0 0 0 0 0 0 0 0 | RESERVED |
| 282 | ADLNG | VALUE | ADMINISTRATIVE INFO LENGTH |
| 284 | BSLNG | VALUE | BYTE STREAM INFO LENGTH |

Fig-12

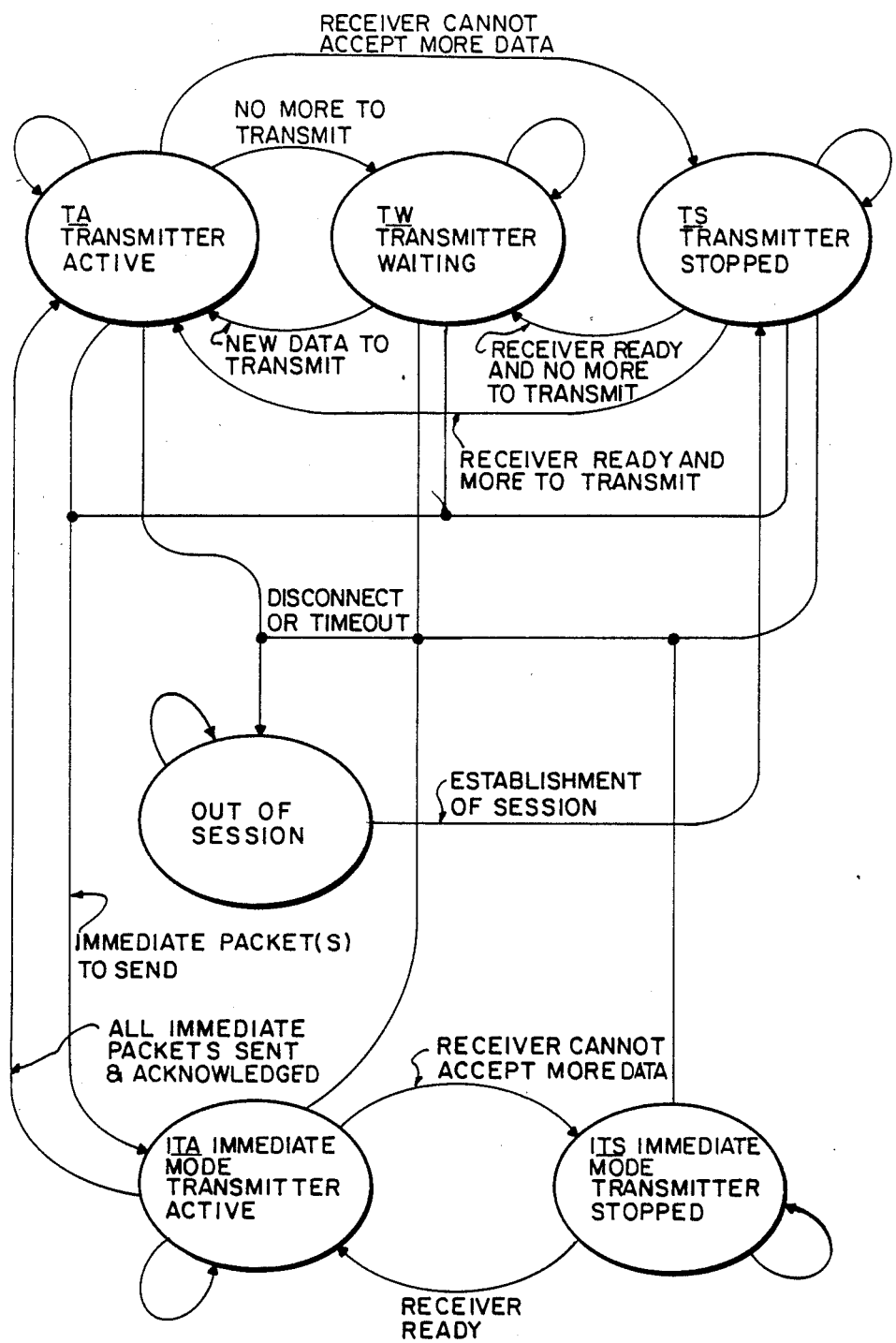
Fig_13

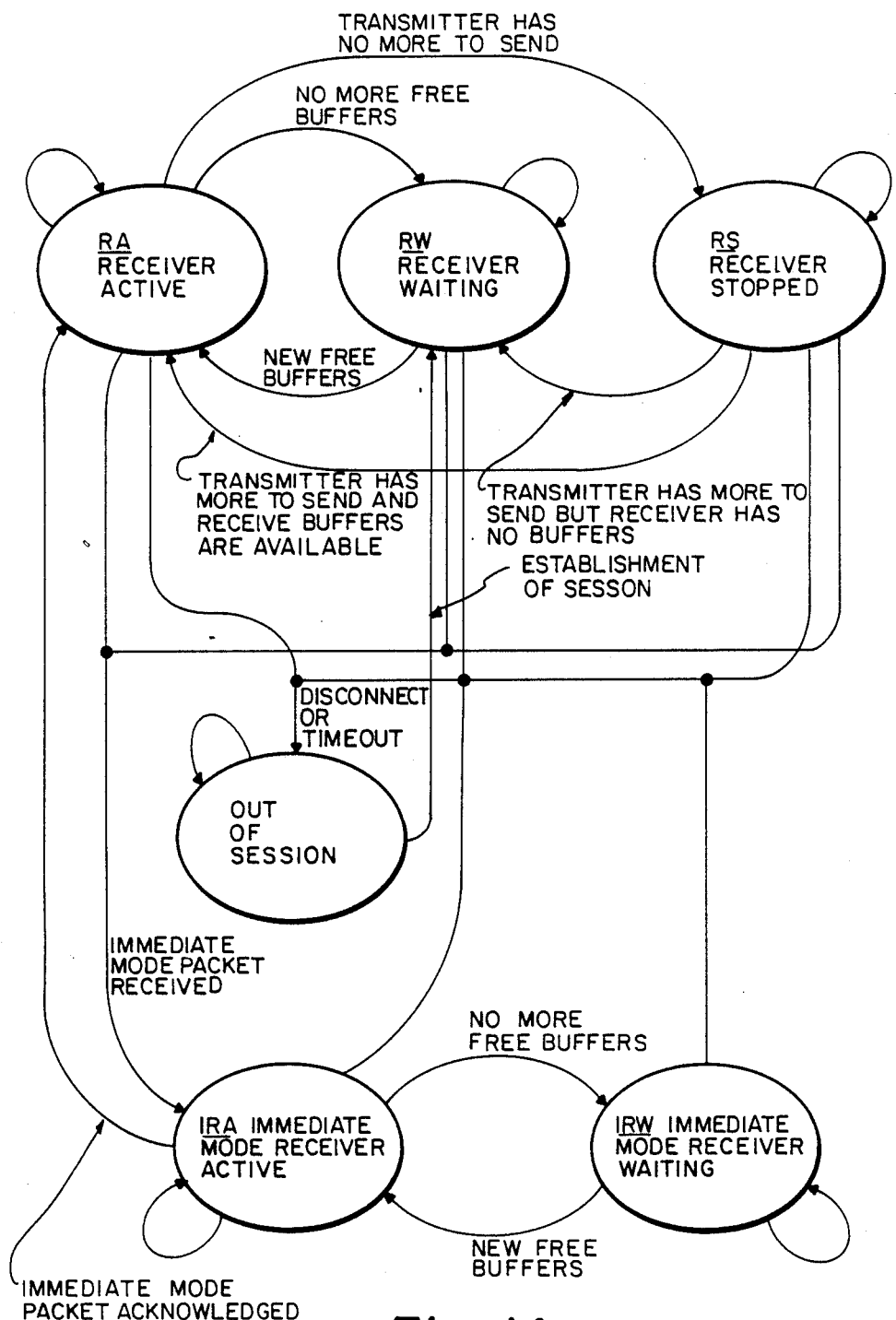
Fig_14

Fig. 15

| EVENT → / STATE | READYn+1 | BUSYn+1 | READYm+1 | NOTHING SENT, DATA AVAILABLE | DATAIn SENT, MORE DATA AVAILABLE | T1 | T2 |
|---|---|---|---|---|---|---|---|
| TA (XMIT ACTIVE) | m:=n<br>FREE BUF ≤m<br>n:=n+1<br>NEXT BUFFER AVAILABLE<br>YES: →TA / NO: →TW | m:=n<br>FREE BUF ≤m<br>→TS | n:=m+1<br>→TA | t=1 OR 1 BUF AVAIL?<br>YES: DATAFn →TA / NO: DATAIn n:=n+1 →TA | n−m <t?<br>YES: DATAFn n:=n+1 →TA / NO: DATAIn →TA | (2 SEC)<br>n:=m+1<br>(RETRY)<br>→TA | (30 SEC)<br>DIS-CONNECT<br>→OUT |
| TW (XMIT WAITING) | DO NOT RESET T2 (ERROR)<br>→TW | DO NOT RESET T2 (ERROR)<br>→TW | IDLEn (RETRY)<br>→TW | t=1 OR 1 BUF AVAIL?<br>YES: DATAFn →TA / NO: DATAIn n:=n+1 →TA | CANNOT OCCUR | (15 SEC)<br>NOPx<br>(KEEP ALIVE)<br>→TW | (30 SEC)<br>DIS-CONNECT<br>→OUT |
| TS (XMIT STOPPED) | n:=n+1<br>NEXT BUFFER AVAILABLE<br>YES: →TA / NO: →TW | DO NOT RESET T2 (ERROR)<br>→TS | DO NOT RESET T2 (ERROR)<br>→TS | — — —<br>→TS | CANNOT OCCUR | (15 SEC)<br>NOPx<br>(KEEP ALIVE)<br>→TS | (30 SEC)<br>DIS-CONNECT<br>→OUT |

| EVENT → STATE | DATAFn | IDLEn | DATAFm | DATAIn | ↑RECV BUFFERS AVAIL | T3 | T2 |
|---|---|---|---|---|---|---|---|
| RA<br>RECEIVE ACTIVE | ACCEPT BUFFER n<br>n := n+1<br>↑FREE BUFFERS AVAILABLE?<br>YES: READYn →RA<br>NO: BUSYn →RW | — — —<br>→RS | READY (RETRY)<br>→RA | FREE BUFFER AVAILABLE?<br>YES: ACCEPT BUFn, n:=n+1 →RA<br>NO: →RA | — — — | (2 SEC)<br>READYn (RETRY)<br>→RA | (30 SEC)<br>DIS-CONNECT<br>→OUT |
| RW<br>RECEIVE WAITING | DO NOT RESET T2 (ERROR)<br>→RW | DO NOT RESET T2 (ERROR)<br>→RW | BUSYn (RETRY)<br>→RW | DO NOT RESET T2 (ERROR)<br>→RW | READYn<br>→RA | (15 SEC)<br>NOPx (KEEP ALIVE)<br>→RW | (30 SEC)<br>DIS-CONNECT<br>→OUT |
| RS<br>RECEIVE STOPPED | ACCEPT BUFFERn<br>n := n+1<br>↑FREE BUFFERS AVAILABLE<br>YES: READYn →RA<br>NO: BUSYn →RW | DO NOT RESET T2 (ERROR)<br>→RS | DO NOT RESET T2 (ERROR)<br>→RS | FREE BUFFER AVAILABLE?<br>YES: ACCEPT BUFn, n:=n+1 →RA<br>NO: →RA | →RS | (15 SEC)<br>NOPx (KEEP ALIVE)<br>→RS | (30 SEC)<br>DIS-CONNECT<br>→OUT |

Fig_17

| EVENT → STATE | READYp+1 | BUSYp+1 | READYp | T1 | T2 |
|---|---|---|---|---|---|
| ITA<br><br>IMMED XMIT ACTIVE | FREE BUFFER p<br>p:=p+1<br>NEXT IMMED BUFFER AVAILABLE?<br>YES: DATAFp → ITA<br>NO: --- → Tx | FREE BUF p<br><br>→ ITS | DATAp (RETRY)<br><br>→ ITA | (2 SEC)<br><br>DATAp (RETRY)<br><br>→ ITA | (30 SEC)<br><br>DIS-CONNECT<br><br>→ OUT |
| ITS<br><br>IMMED XMIT STOPPED | p:=p+1<br>NEXT IMMED BUFFER AVAILABLE<br>YES: DATAFp → ITA<br>NO: --- → Tx | ---<br><br>→ ITS | DO NOT RESET T2 (ERROR)<br><br>→ ITS | (15 SEC)<br><br>NOPx<br>(KEEP ALIVE)<br><br>→ ITS | (30 SEC)<br><br>DIS CONNECT<br><br>→ OUT |

Fig_16

| EVENT → STATE | DATAFp | DATAF p-1 | RECV BUFFER AVAIL | T3 | T2 |
|---|---|---|---|---|---|
| IMMED RECEIVE ACTIVE | ACCEPT BUFFER p<br>p:=p+1<br>FREE BUFFER AVAILABLE?<br>YES: READYp → RX<br>NO: BUSYp → IRW | READYp (RETRY)<br><br>→ IRA | ---<br><br>→ IRA | (2 SEC)<br><br>READYp (RETRY)<br><br>→ IRA | (30 SEC)<br><br>DIS-CONNECT<br><br>→ OUT |
| IRW<br><br>IMMED RECEIVE WAITING | DO NOT RESET T2 (ERROR)<br><br>→ IRW | BUSYp (RETRY)<br><br>→ IRW | READYp<br><br>→ Rx | (15 SEC)<br><br>NOPx<br>(KEEP ALIVE)<br><br>→ IRW | (30 SEC)<br><br>DIS-CONNECT<br><br>→ OUT |

Fig_18

INPUT/OUTPUT NETWORK FOR COMPUTER SYSTEM

This invention relates to improving the input/output (I/O) of a computer system, and is particularly useful for economically connecting to the computer system a relatively large number of low or medium speed I/O devices or peripherals of mixed types over a relatively large geographic area to achieve efficient time sharing of the computer system resources and effective communication between the I/O devices and the computer system.

BACKGROUND OF THE INVENTION

The increasing demand for the time sharing of computer resources among a plurality of different, relatively low speed, external I/O devices has caused a number of evolutionary changes in computer system architecture over the years. Many of these changes have centered around the I/O subsystem. I/O channel controllers have been devised to avoid restricting the processing speed available from modern central processors and to attempt to accommodate increasing numbers of I/O devices. I/O channel controllers are usually of either a bulk storage type or a character type. A bulk storage I/O channel controller is used for controlling high speed transfers of relatively large amounts of data from one or more external bulk storage devices, such as disk drives, over the bus of the computer system to the system main memory. Due to the relatively small numbers of bulk data transfers and the relatively large amount of data transferred during each single continuous high speed transfer operation, the efficiency of operation of bulk storage channel controllers is not usually considered to be a major limiting factor. However, substantial limitations have been caused by attempting to transfer relatively small amounts of data, usually characters, a relatively large number of times on an intermittent basis, as is the case with a relatively large number of relatively low and medium speed I/O devices such as terminals and printers. The character I/O channel controllers which have evolved in response to the increased use of low and medium speed I/O devices have continued to increase in complexity and may be reaching the point of diminished effectiveness relative to the improvements attempted to be gained.

The most common version of a character I/O channel controller uses its own relatively complex processor to multiplex data to and from a fixed number (e.g. 8, 16 or 32) of I/O devices connected to it. The character channel controller's I/O ports may be limited to a specific type of device for strictly local connection. If the character channel controller is not device specific, a similarly complex I/O adapter is required to communicate between the I/O channel controller and each device or group of devices. The operating functions of the I/O channel controller, the I/O adapter, the host computer, and the I/O devices are shared between all of these components. The communication and control protocol used to accomplish such communication is usually complex, requires substantial overhead in the operating system, generally complicates the transfer of I/O data, and usually limits the data throughput.

The majority of the cost incurred in connecting devices to the computer systems is created as a result of the relatively complex operating nature of the I/O processors in the channel controllers and adapters and the protocol which is required. In order to defray some of this relatively high cost, it is typical to provide a multiplicity of ports at each I/O adapter for the purpose of connecting a multiplicity of I/O devices. The I/O devices must usually be located in close physical proximity to the I/O adapter because cable lengths can restrict the speed at which reliable data transfers can be accomplished. To connect a new I/O device to the computer system in cases where an unused port on a multiport I/O adapter is unavailable, another multiport I/O adapter must be connected to the channel controller. The user incurs connection costs which are not necessarily related to the addition of each new I/O device on the system, because the addition of each new multiport adapter involves paying for the capability of connecting a multiplicity of I/O devices, whether or not all of these connection ports are utilized. In some situations, the cost of connecting an I/O device to the system may exceed the cost of the I/O device itself.

The type of multiplexing used in character I/O channel controllers and adapters may also create limitations. One type of multiplexing is known as centralized polling. With centralized polling, the central processor sends signals which interrogate each I/O device in order and regardless of whether or not it has data to send. Another form of polling, known as induced polling or polling on demand, initiates this type of centralized polling only when an adapter sends a change of status signal. Induced polling avoids the processing burden or overhead of continuously polling all of the adapters and I/O devices, but requires all of the adapters to be polled in order once during any polling sequence. Polling requires considerable software functionality at either the central processor or channel controller, and wastes time in polling both the active and inactive I/O devices, and in interpreting the results of the polling.

Another type of multiplexing is generally referred to as access on demand. Access on demand multiplexing usually involves a request from an adapter for access to the communication link and some form of arbitration for resolving competing requests from different adapters. Signal propagation delays in arbitration systems can create significant adverse influences. Because signal propagation delays increase with greater physical cable lengths, arbitration techniques utilizing the central processor or system bus controller to resolve competing requests, known as centralized arbitration schemes, are usually limited to computer busses and other applications where the distances between the I/O adapters generating the requests and the arbitration logic extend no more than a few feet.

Token passing is a technique of distributed control or arbitration which has been used with success in local area networks (LAN).

BRIEF SUMMARY OF THE INVENTION

The present invention is designated as an I/O network (IONET) channel for a computer system. In general, the IONET channel is for means of highly effective character and other communication between a plurality of low and medium speed devices of the same or mixed types connected directly to the I/O subsystem of a computer system, by using arbitration over LAN-type communication medium, relatively low cost point of use adapters with microcomputers distributed over the medium and connected to each I/O device individually or to a relatively small number of I/O devices, and a communication and control protocol which efficiently controls the microcomputers and to control communication of the data between the I/O devices and the computer system memory. The LAN-type communication medium, the protocol and the distributed low cost point of use adapters cooperatively function as an improved I/O channel controller, but without the significant limitations previously discussed.

The I/O devices can be attached at substantially greater distances from the central processor than for typical I/O channels because the arbitration control permits such connections without the attendant reduction in data throughput, and because LAN technology provides reliable data communication at longer distances than other schemes compatible with low cost cables. The communication and control protocol is relatively simple, does not require substantial overhead, and is conducive to efficient data throughput. The point of use adapters are relatively simply implemented and respond directly and effectively to the commands of the protocol to control data transfers. The user incurs relatively low, fixed per-connection connection costs to attach each new I/O device to the system, thereby avoiding the large costs of single expensive shared logic multiplexing adapters and the physical placement restrictions associated with connecting the I/O devices to such shared logic multiplexing adapters. The I/O devices can be positioned at widely distributed locations. The data throughput capabilities do not require real time sharing of the much faster central processor, despite the fact that communication is occurring with considerably slower I/O devices. The user of each I/O device has access to the resources of a complete computer system without placing a complete computer system at each I/O device or terminal.

The protocol of the present invention achieves significant conservation of network bandwidth because it incorporates transport level flow control. Packets of data are not attempted to be sent until it is established that the packets can be received. The protocol is generally immune from the loss or duplication of any one packet at any time. If a packet is duplicated or omitted the system will inherently recover at the transport level. Data messages can be forwarded between separate network segments. The invention can also provide the appearance of a privately connected local device even in a multiprocessor environment, which is very useful for security considerations and restricting access to information. A significant part of the multiplexing function and the network control function has been moved into the protocol.

The present invention can be better understood from the following detailed description of a preferred embodiment of the present invention, which is also illustrated in the accompanying drawings that are briefly described below. The actual scope of the invention is defined by the appended claims, and the description of the invention above should be considered only as a generalized summary of certain features.

BRIEF DESCRIPTION OF THE DRAWINGS

FIG. 1 is a generalized block diagram of a typical prior art computer system to which a bulk storage I/O channel, a character I/O channel and a local area network are connected.

FIG. 2 is a generalized block diagram of a computer system utilizing the IONET channel of the present invention.

FIG. 3 is a block diagram illustrating the connection of a plurality of I/O devices by a plurality of IONET channels to a single computer system.

FIG. 4 is a block diagram illustrating the connection of a plurality of computer systems by one IONET channel to a plurality of I/O devices.

FIG. 5 is a block diagram illustrating a plurality of computer systems interconnected by an LAN and with each computer system having an IONET channel connecting a plurality of I/O devices to each computer system.

FIG. 6 is a block diagram of a point of use (POU) adapter of the IONET channel interconnecting an I/O device to a cable of the IONET channel.

FIG. 7 is a block diagram of a computer system connected to the cable of the IONET channel.

FIG. 8 is a block diagram of an exemplary POU adapter using an RS 232 serial device interface.

FIG. 9 is an illustration of the seven layer Open System Interface (OSI) architecture of the International Standards Organization reference model for communication.

FIG. 10 is an illustration of an IONET packet of information communicated over the IONET channel, shown in sequential byte form, FIG. 11 is an illustration of the IONET packet shown in FIG. 10 which is broken down into the hierarchical levels corresponding to the physical, link, network, transport and session levels of the OSI model.

FIG. 12 is a chart which illustrates in greater detail the bit layout and other details of some of the individual bytes of the IONET packet shown in FIG. 10.

FIG. 13 is an illustration of a generalized state transition diagram for a transmitter state machine of the POU adapter of the present invention.

FIG. 14 is an illustration of a generalized state transition diagram for a receiver state machine of the POU adapter of the present invention.

FIG. 15 is a chart which characterizes the operation of the transmitter state machine in a normal mode.

FIG. 16 is a chart which characterizes the operation of the transmitter state machine in an immediate mode.

FIG. 17 is a chart which characterizes the operation of a receiver state machine in the normal mode.

FIG. 18 is a chart which characterizes the operation of a receiver state machine in the immediate mode.

DETAILED DESCRIPTION

The present invention can be better understood by reference to a typical prior art computer system 100 which is illustrated in FIG. 1. The computer system 100 includes the typical processor 102 which is connected to and communicates with the typical system main memory components 104. A typical I/O subsystem 106 is provided for communicating data to and from the main memory 104. The processor 102, the main memory 104 and the I/O subsystem 106 are all capable of communicating with each other at the high internal capacities or bandwidths that typify a modern computer system.

The I/O subsystem 106 will have one or more external interconnections for external peripherals. These external connections are typically called I/O channels. In most modern computer systems two types of I/O channels are employed. One type of I/O channel is a bulk storage I/O channel 108. The bulk storage I/O channel 108 is typified by supporting the high bandwidth transfers typical of disk 110 and tape 112 storage devices. A bulk storage I/O channel 108 is typically limited in length to tens of feet. A bulk storage channel 108 is able to perform data transfer to and from only one I/O device at a time, although some bulk storage I/O channels are capable of handling overlapping operations where different devices are accessing data simultaneously but only one is only physically transferring data at a time. In general, a bulk storage channel is not optimally suited for handling lower speed or less continuous duty cycle data transfers between system memory and I/O peripherals because of, among other things, relatively expensive cabling requirements relatively extensive interface circuitry, physical distance restrictions, and the optimization of the bulk storage I/O channel 108 for transfers of relatively large blocks of data with each transfer.

To accommodate a relatively large number of individual transfers of relatively short amounts of data, most computer systems also incorporate a character I/O channel 114. The term "character" describes its most predominant use, transferring data entities representating alphanumeric and special characters to and from external peripherals. However, the term "character" is in no way indicative of a restriction that only characters may be transferred. Graphics data, arbitrary binary data and other encodings of information may be transferred over the character I/O channel 114. The character I/O channel 114 is typified by a parallel or serial data bit transmission occurring at a speed generally lower than that of the bulk storage I/O channel 108, but at a speed faster than any of the individual peripherals attached to the character I/O channel 114. The character I/O channel 114 is optimized for short transfers to a relatively large number of peripherals rather than long transfers to a small number of peripherals.

In medium and small sized computer systems, the most common connection arrangement to connect an I/O device is one or more multiport interface or adapter 116 attached to the channel 114. Typically the adapter 116 will be a part of the overall computer system 100. A number of low speed serial or parallel communication interfaces 118 exit the enclosure for the computer system 100 and electrically connect to and communicate with peripherals such as terminals 120, printer 122 and modems 124, for example. The interfaces 118 are typically low speed communication cables which tend to be severely limited in length unless modems are used, are limited in speed normally to a few tens of kilobits per second at most, and limit the computer system capacity because each one of the cables 118 takes a noticeable amount of space on the back panel of the computer system 100 enclosure. Often, the number of external cables 118 which a modern computer system can support is more constrained by the amount of back panel space rather than the actual available I/O bandwidth of the computer system.

It is also typical practice to directly connect the multiport adapter 116 to the I/O character channel 114 within or immediately adjacent to the computer system enclosure. However, such direct connection is limited to a relatively short distance, thereby placing the multiport adapter 116 at a distance not significantly removed from the location of the computer system itself.

In most large scale computer systems, the multiport adapter 116 actually includes a dedicated processor, often referred to as a front end processor, to actually control the communication and multiplexing between the various peripherals and the computer system 100. The functionality of the adapter 116 tends to be rather complex, thereby requiring a relatively complex and expensive processor of its own to prevent the processing requirements for the control of low speed I/O devices from placing an excessive load on the control processor 102. Furthermore, the communication and control protocol between the I/O subsystem 106 and the multiport adapter 116 tends to be complex and to require considerable internal communication overhead to and from system memory 104, in order to accomplish the multiplexing between the peripherals.

The expense of the shared logic and relatively complex hardware required to be incorporated in each of the multiport adapters 116 has required that they have the ability to connect to a plurality of peripherals, typically at least 4, usually 8 or 16, and sometimes 32 peripherals. Cost effectiveness is thereby gained, provided that there are actually a large number of peripherals to be connected to each adapter 116. Should all of the interfaces or cables 118 be occupied, it is necessary for the user to attach another multiport adapter 116 to the computer system to accommodate the next additional peripheral. The incremental cost for attaching such an additional peripheral can be extremely high and/or prohibitive, and may very well exceed the cost of the peripheral itself. Furthermore, because of the distance limitations of the character I/O channel 114 and the length limitations of the interface cables 118, all of the peripherals must be physically located at relatively close distance to the multiport adapter 116.

Devices having essentially the same general functionality as the multiport adapters 116 described above are sometimes referred to as I/O channel controllers.

In many cases, a local area network (LAN), designated 126, is also attached to the computer system 100. Typically a LAN adapter 125 is used between the LAN medium 128 and the I/O subsystem 106. This LAN adapter most frequently attaches to the character I/O channel 114. A LAN 126 typically includes a network communication medium or cable 128 to which a plurality of computer systems are connected for the purpose of sharing information. Each of the computer systems is connected to the LAN cable 128 at a tap or drop 130. Each system connected to the LAN cable 128 at a tap 130 is referred to as a Node. A variety of different conventional configurations of LANs are available, such as token rings, token busses, contention arbitrated busses and the like. The most significant differences between various conventional LANs is based on the sophistication of the networking software, thereby providing different degrees of resource sharing and functionality.

The network cable 128 can extend relatively long distances from the host or main computer system 100 to other Nodes. Some of these Nodes are other general purpose computer systems 100'. Some Nodes of the LAN may be special purpose devices known as front end processors 132. Front end processors are sometimes called cluster servers. The front end processors 132 do not provide general computing services, but serve as transparent interface elements to permit the attachment of terminals 134 or other non-computer I/O devices. Although connected by the LAN 126 to the I/O subsystem 106 through a LAN adapter 125, the disadvantages discussed in conjunction with the multiport adapter 116, which relate to the complex processing functionality, cumbersome overhead, and shared logic for multiplexing, generally applies to each of the cluster servers 132 as well. Certainly the cost effectiveness of each cluster server 132 is dependent upon connecting a relatively large number of I/O devices 134 to it at relatively short distances. The incremental cost for attaching additional terminals to the LAN is usually magnified, however, because typically not all of the terminals can be located physically close to the cluster server. As a consequence, more cluster servers or other front end processors must be used than are actually needed just to accommodate the physical spacing of the I/O devices. This requirement contributes significantly to the cost of adding additional I/O devices.

In contrast to a typical prior art computer system, the present invention is illustrated generally in FIG. 2. An input/output network (IONET) channel 140 is provided for connecting the computer system 100 to a plurality of I/O devices, for example, terminals 142, printers 144, personal computers 146, miscellaneous data collection equipment 148, modems 150, and statistical multiplexers 152. The modem 150 communicates over telephone lines 154 with a remote computer system 156, for example. The statistical multiplexer 152 communicates over telephone lines 158 to a physically similar remote unit 160. A plurality of remote terminals 162 are connected to the remote statistical multiplexer 160. The statistical multiplexers 152 and 160 reduce telephone line costs by combining the aggregate input/output going to and from the several, co-located remote terminals 162 on a single telephone line 158. As used herein an "I/O device" is a peripheral which cannot operate autonomously and requires some type of interface adapter to attach to a computer system, and is to be distinguished from a "Device" which does contain its own processor as is defined in greater detail below. An I/O device performs I/O information transfers.

The IONET channel 140 combines certain features of a token passing LAN and the character I/O channel to achieve significant improvements in attaching a relatively large number of low and medium speed I/O devices to the computer system while avoiding many of the significant limitations present in the prior art. Although the IONET channel 140 is primarily a character channel, arbitrary byte streams may be transferred over this channel and its use is not restricted to character transfer situations.

The IONET channel 140 comprises a communication medium or cable 170, a plurality of point of use (POU) means or adapters 172 connected to the cable 170, and means for connecting the computer system 100 at a node 174. The term "node" refers to the electrical connection to the cable, and is to be distinguished from the term "Node" which generally refers to all the equipment connected at a node, as is defined in more detail below. The IONET channel 140 can become the interface means by which the computer 100 is connected to the various I/O devices. An I/O device is intended to encompass all the variety of different types of non-processor, non-bulk storage peripherals which might be attached to the IONET channel, such as the terminals 142, printers 144, personal computers 146, data collection equipment 148, modems 150, statistical multiplexers 152, and the like.

The computer system 100 is simplified because it does not require separate LAN, multiport adapter, and miscellaneous other capabilities in its own character I/O channel interface repertoire. Furthermore, the computer system does not require the functionality of a network Node in the LAN protocol in order to communicate with peripheral devices, thereby allowing the computer system to avoid having to support a LAN protocol unless LAN communication with other computer systems is necessary. In contrast, a protocol suitable for use in conjunction with the IONET channel 140 is primarily for I/O device interfacing, and is not for resource sharing or remote operating system functions. As a result, the IONET protocol is relatively simply implemented at each of the remote I/O devices by the POU adapters 172.

The POU adapters 172 need not be physically located in relatively close proximity to the computer system 100 but rather, may be removed to considerable distances. For example, in the preferred embodiment of the present invention, the I/O devices can be located as much as 22,000 feet from the computer system 100. The data going to and from the I/O devices is multiplexed on the single serial cable 170. The POU adapters 172 are located within or adjacent to the I/O devices to which they attach. Examples of POU adapters 172 located within or embedded within the I/O devices are illustrated by the personal computers 146, wherein the POU adapters 172 are illustrated as enclosed within the same housing as the personal computers 146.

To accommodate a much larger computer system which attaches a larger number of I/O devices, a multiplicity of IONET channels 140a and 140b can be connected to the same computer system as is shown in FIG. 3. FIG. 3 illustrates the manner in which this approach can extend to support large numbers of I/O devices without a correspondingly large increase in the number of cables entering and leaving the computer system 100 enclosure. Each of the IONET channels 140a and 140b utilize a single conductor 170a and 170b respectively, and each of the IONET channels makes a single interface with the I/O subsystem of the computer system 100. By bringing out the low and medium speed I/O capabilities of the computer system in the form of the IONET channels illustrated, and by distributing the functions normally associated with the multiport adapters or front end processors into a plurality of POU adapters, the amount of panel space, and the cable innerconnection required on the host computer system is substantially reduced. Also, access to the computer system enclosure is not required to add peripherals. Furthermore, the communication bandwidth is not reduced, since the aggregate bandwidth is measured by the several millions of bits per second of the LAN-type medium rather than the several thousands of bits per second typical of low speed communication cables coming out of the typical computer system.

Another significant configuration benefit of the present invention is illustrated in FIG. 4. Conventional I/O channels, whether of the bulk storage or character oriented type, are limited to being attached to a single computer system, in order to provide the conduit for transferring information between the computer system and a plurality of external peripherals. Because of the nature of the present invention, it is possible to attach a plurality of computer systems 100a and 100b to a plurality of I/O devices 176 by a single shared IONET character channel 140 as is illustrated in FIG. 4. Any one of the I/O devices 176 can communicate with either computer system 100a or 100b. There is no limit to the number of such computer systems which can be connected to the IONET character channel, other than as might be imposed by the aggregate channel bandwidth and physical limitation of the number of Nodes to which the IONET channel 140 can support. This benefit is particularly important because there is no physical switching or physical multiporting involved. This is in contrast to the conventional use of a multichannel switch on a peripheral or I/O channel for switching between conventional I/O channels, and is in contrast to the use of conventional patch panels or electronic switching systems which are available for controlling the connection of peripherals on multiple channels. Such conventional arrangements require increased costs and may decrease reliability, because of the additional hardware necessary to connect the particular peripheral to multiple I/O channels. Communication over the IONET channel is controlled by conducting address signals or tokens over the cable, as will be described in greater detail later. The connection capabilities are therefore based on software and firmware operating in the computer system and POU adapters, and allows each of the I/O devices to be switched onto or off of the IONET channel by redirecting the tokens. Since no physical switching needs to be done, the failure of any one of the computer systems does not immobilize the devices attached to that computer system since the attachment is logical. The present invention also incorporates security facilities to permit an I/O device to appear to be directly attached to a single computer system despite the presence of many such systems on the same cable. These facilities are discussed in more detail below.

The normal configuration of networked computer systems, each of which incorporates the IONET channel, is illustrated in FIG. 5. Two separate computer systems, 100a and 100b, are connected for the purpose of resource sharing by the single cable 128 of the LAN 126. Each of the computer systems 100a and 100b has an IONET channel 140a and 140b, respectively, connected to it by which to attach a plurality of I/O device 176. The ability for any I/O device 176 attached to any particular IONET character channel to access resources on computer systems other than the computer system to which the particular IONET channel is connected is a function of the LAN support in the operating system software running on the computer systems, and will be present to the degree to which that system software supports the functionality. Another beneficial advantage of the present invention which is not specifically illustrated, but which can be understood by reference to FIG. 4, is the possibility of using the single cable 170 for achieving the functionality of both a LAN and the IONET character channel. In such a circumstance, the software within each of the computer systems 100a and 100b supports both the LAN inter-computer protocol and the IONET protocol. Thus, the single cable system is capable of handling the combined traffic of the resource sharing activities in the LAN and the peripheral I/O activities on the IONET channel. Such an arrangement will utilize more transfer bandwidth with the same number of attached I/O devices, and should be used only where the aggregate bandwidth of the cable is sufficient to handle this combined load. When the single cable is shared this provides a very economical means of interconnection. Such an arrangement requires even less cable leaving the computer system enclosure than in the separate LAN and IONET channel configuration illustrated in FIG. 5.

The preferred embodiment of the present invention has been implemented in conjunction with certain hardware components and protocol used in a LAN known as ARCNET, which is a product of the assignee. ARC-NET is a trademark of the assignee hereof, and has been registered in the United States Patent and Trademark Office. There is, however, no restriction that the present invention be implemented with ARCNET LAN technology. The present invention can be implemented with any type of token passing LAN technology. However, the present invention is described in conjunction with its preferred embodiment which utilizes ARCNET supported LAN technology.

The hardware and software components of an ARCNET LAN are commercially available and well known. The assignee hereof has published extensive information regarding its ARCNET LAN, in, among other things, the ARCNET Designer's Handbook, copyright 1983, and available from the assignee. Furthermore, the Standard Microsystems Corporation of 35 Marcus Boulevard, Hauppauge, N.Y. 11788, has manufactured two of the significant integrated circuits which are utilized in the ARCNET LAN and in addition has published significant operating information which allows those skilled in this field to build and use the ARCNET LAN. Such descriptions can be found in the Standard Microsystems Corporation data catalogue, published in 1985, at pages 193 through 213. In view of the relatively well known and appreciated nature of the ARCNET LAN technology, the ARCNET features utilized in conjunction with the present invention will be described below in a relatively abbreviated sense.

The ARCNET LAN is based on a token passing system. In a token passing system, each Node on the network awaits the arrival of a unique short sequence of digital bits, i.e. a signal known as a token, from a logically adjacent upstream Node. Receipt of the token indicates that the Device at that Node is then allowed to communicate information over the network. The network is arranged to assure that only a single token is present on the network at a time. After communicating the information, the Node sends the token to the next logically succeeding Node on the network where the procedure repeats. If a Node receives the token when it has noting to send, it passes the token immediately. The ARCNET LAN is arranged so that only active Nodes are present on the network at any time. Thus, those Nodes which are inactive or powered off are not logically or electrically participating in the receipt and transmission of the tokens. The ARCNET network is capable of reconfiguring itself to accommodate Nodes which join the network and to eliminate Nodes which drop off of the network by dynamically adjusting the addresses of the Nodes to which the token is passed. Such changes in the activity state of Nodes may occur while the network is in operation without affecting network operation above the link level.

The standard communication medium used on the ARCNET LAN is an RG-62 coaxial cable. This cable is designated 170 in FIG. 2. Other communication media may include fiber optics, free air infrared links, microwave links and shielded twisted pair cables.

Connection capabilities to the coaxial cable are simplified by the use of connectors known as "hubs". Each hub contains a plurality of ports to which media interface units known as resource interface modules or RIMs can be attached in order to communicate with each processor, or to which other links of cable are attached. A RIM is present at each Node. Hubs serve as active or passive repeaters between sections of cable and do not have any function in signal routing. A hub simply retransmits any incoming signal over each of its other ports as an outgoing signal. Hubs have also been described in the published literature relating to the ARCNET LAN, and are also available for purchase on the commercial market.

The physical topology of the ARCNET LAN is that of an unconstrained branching tree. The logical configuration of the electrical connectivity of the ARCNET LAN is that of a bus in which each transmitting Node transmits its signals to all other Nodes on the LAN. The cabling in the ARCNET LAN is bi-directional meaning that signals flow in both directions, alternately, over the cable. In terms of media access control the ARCNET LAN is a logical ring based on arithmetically ascending network RIM identification values. The LAN automatically reconfigures itself to eliminate inactive Nodes from the logical ring and to add newly active Nodes to the logical ring so that the token is passed from active Node to active Node based on RIM identification numbers. Time is not wasted in transferring the tokens to Nodes which are inactive. The token may be passed from active Node to active Node without regard to the physical location or position of the Node on the network. The token passes between all the active Nodes on the network before returning to the original Node, thereby following a ring-like pattern.

The RIM serves as the physical interface means to the communication media or cable 170, both in the present invention and in a conventional ARCNET LAN. One such RIM, designated 178, is included within each POU adapter 172 and in each computer system 100a attached to the interconnection media cable 170 as is shown in FIGS. 6 and 7, respectively. Each RIM 178 includes a transmitter by which to transmit or broadcast signals onto the cable 170, a receiver which receives the signals broadcast over the cable 170, a plurality of message buffers for receiving and holding the messages or signals to be transmitted and which are received over the cable 170, and the arbitration and other logic required to share the buffers between the processor to which the RIM is attached, such as the microcomputer 180 shown in FIG. 6, or the control processor 102 shown in FIG. 7, and to accomplish its other functions. The RIM uses base band signaling over the interconnect cable 170. The RIM 178 is transformer coupled to the interconnect cable 170, which allows it to be powered on and off while the LAN is in operation with minimum impact on the operation of the network and no impact in terms of degrading network performance when the RIM is powered off. Each RIM is assigned a physical address, often referred to as a RIM ID. This address is used to accomplish the token passing.

In addition to the RIM 178, each POU adapter 172 includes a microcomputer 180 and a device interface 182, as shown in FIG. 6. The microcomputer 180 has sufficient computing power to handle the necessary data rate and implement the IONET channel communication and control protocol. In contrast to prior art cluster servers or other multiport adapters, the microcomputer 180 does not include operating system functionality, LAN functionality or other multiuser functionality. A substantial savings in overhead and an increase in network bandwidth is thereby obtained, as well as a considerable decrease in cost.

The microcomputer 180 might better be described as a microcontroller which contains a simple central processing unit (CPU) plus a small amount of random access memory (RAM), a small amount of read only memory (ROM) and various I/O and timer functions on a single integrated circuit chip. The preferred embodiment uses a Hitachi HD63B01Y0 microcomputer which was chosen for its cost and space effectiveness. More information regarding this microcomputer can be found in the Hitachi Microcomputer Data Book No. U71 of July 1985 at pages 358 to 405.

The device interface 182 of the POU adapter 172 is specific to the particular type of I/O device 176 attached to the POU adapter 172. For example, the device interface 182 may be an RS-232 serial interface for attaching terminals and modems, an 8-bit parallel interface for attaching low cost printers, an interface for attaching the most popular varieties of personal computers, or an 8-bit general purpose handshake interface for attaching some types of peripheral devices.

The point of use adapter 172 can be embedded in any particular type of Device as is illustrated in FIG. 2, or may be a separate enclosure attached at a physically close location to the device. In all cases, the interconnect cable 170 directly attaches to the POU adapter 172.

FIG. 7 illustrates the connection of a computer system 100a to the cable 170 of the IONET channel. The central processor 102 of the computer system is connected to the RIM 178, and the RIM is connected to the cable 170 at a node 174. By comparing FIGS. 6 and 7, it can be readily understood that the IONET function of the central processor 102 is entirely similar to that function of the microcomputer 180, except that the central processor or the computer system does not interface directly with I/O devices. Thus, the central processor 102 simply supports the IONET protocol and communicates directly through the RIM over the cable 170, without requiring the use of separate protocols required to obtain communication to and from channel controllers and multiport adapters as is common in the prior art. Only the RIM is necessary to interface computer systems to the cable, to achieve the equivalent IONET functionality of a complete POU adapter. If more than one IONET channel is used from a single computer system 100 (FIG. 3) more than one RIM 178 is required.

FIG. 8 illustrates a representative POU adapter 172a in greater detail. The adapter 172a supplies serial data to and receives serial data from a conventional I/O device 176a in the RS 232 format.

The RIM 178 includes a hybrid circuit 190 which is electrically connected to the interconnection communication medium or cable 170. The hybrid circuit 190 is a commercially available product and is available for sale from Centralab, Inc., 2601 South Moorland Road, P.O. Box 2145, Milwaukee, Wis. 53201; or from Micro Technology, Inc., W141 N5984 Kaul Avenue, Menomonee Falls, Wis. 53051; or from Zenith CRT and Components Operations, 100 Milwaukee Avenue, Glenview, Ill. 60025. The hybrid circuit includes the transformer coupling. A clock oscillator 192 supplies clock signals to the transceiver 194. In addition to controlling the signals within the POU adapter 172a, the clock 192 also establishes synchronization with respect to the data bits appearing on the cable 170. The transceiver 194 is a commercially available item from Standard Microsystems Corporation under the designation COM 9032. The transceiver 194 contains a transmitter which supplies signals to, and a receiver which receives signals from, the hybrid circuit 190. The transceiver 194 also supplies clock signals to a controller 196, and to the microcomputer 180 over the conductor 198.

The controller 196 is the heart of the RIM 178. Connected to the controller 196 are a series of switches 200 by which to establish the unique RIM identification number (RIM ID). The RIM ID is synonymous with the Node on the network to which the RIM 178 is attached. The controller 196 contains a microprogrammed sequencer and all of the logic necessary to control token passing on the network and to send and receive data packets at the appropriate time. The controller 196 also establishes the network configuration and automatically reconfigures the network as new Nodes are added to or deleted from the network. The controller 196 also performs address decoding functions, cyclic redundancy checking (CRC) during packet generation and reception and packet acknowledgement as well as other network functions. The controller 196 is a commercially available item from Standard Microsystems Corporation under the designation COM 9026.

A standard multiplexed address/data bus 202 extends from the controller 196, and is the means by which a data and address communication interface is accomplished. A uni-directional address driver 204 and a bi-directional data transceiver 206 may also be connected to the bus 202 for the purpose of allowing the microcomputer 100 to access this bus.

An external packet buffer, random access memory (RAM) 208 is also connected to the bus 202. For purposes of the present invention, the RAM 208 should include at least 2048 of 8-bit storage locations, which is sufficient to hold up to 8 complete IONET packets. The RAM 208 may be accessed by both the controller 196 and the microcomputer 180. A buffer pointer 210 is provided for the purpose of identifying which of the 8 packet storage areas are to be used for transmission of packets, reception of packets, and processing of packets by the mircocomputer 180. The controller 196 supplies all the signals necessary to allow arbitration of access to the RAM 208 buffer between itself and the microcomputer 180. The RAM 208 is a conventional digital product memory item.

The microcomputer 180 contains the necessary memory and processing capability to respond to the control information contained within the IONET protocol, for control and byte stream data communication purposes. The microcomputer 180 functions in conjunction with the controller 196 and transceiver 194 to implement a transmitter state machine and a receiver state machine. The transmitter state machine controls the transmission of signals from the RIM 178 onto the cable 170. The receiver state machine controls the reception of signals from the cable 170 to the RIM 178. The information encoded into the transmitted signals and decoded from the received signals is stored in the designated areas of the packet buffer RAM 208.

The microcomputer 180 includes a parallel I/O port 212 and a serial I/O port 214. The serial I/O port 214 is connected to line drivers and receivers 216 to communicate with the I/O device 176a, in the case of the RS-232 POU adapter 172a shown in FIG. 8. For other types of device interfaces the parallel port 212 may be used.

Having described the general arrangement of components in the IONET channel of the present invention, the definitions set forth below can be better appreciated. These definitions relate to the more specific features of the present invention. A "Server" is a processor which simultaneously supports multiple IONET sessions with the binding between its subaddresses and its internal, functional entities capable of being assigned dynamically at session initiation. A "Client" is a POU adapter (or computer) which supports one or more IONET sessions with fixed binding between its subaddresses and its internal, functional entities. A "Device" is an entity at one end of the full-duplex communication path of an IONET session. The terms "Client" and "Server" are used herein as descriptive terms relating to typical usage patterns. Communication using the present invention can be established by pairs of Devices, whether Client and Client, Server and Server, or Client and Server. A Device is identified by an address, which is the RIM ID of the processor or POU adapter associated with the Device, and a subaddress, which is the means for discriminating the source and destination Devices for each packet at each processor or POU adapter which may connect a plurality of Devices simultaneously. A "Node" refers to everything attached to the IONET channel with a RIM. A "session" is a point to point full duplex virtual circuit established between a pair of Devices. A session consists of two "half sessions". A half session is the communication link between a transmitter at one Node and the receiver of the corresponding session partner at the other Node. There are two half sessions, one in each direction, for every full session that is established.

The signals conducted over the cable 170 control communication over the network. Those signals form an IONET protocol for communication and control over the IONET channel. The IONET protocol takes advantage of the properties of the ARCNET local area network hardware, but the IONET protocol is not ARCNET specific. The IONET protocol could operate with comparable efficiency and identical functionality on any token based network, but may operate with reduced efficiency when arbitration techniques other than token passing ar employed.

The preferred embodiment of the interfaces to the network is constrained only by the need to support the IONET protocol and to interface to the LAN medium which has been utilized, such as the ARCNET LAN. The IONET protocol operates independently of any particular device or any particular operating system and independently of the characteristics of any I/O channels on various computer systems.

The IONET protocol is a completely peer to peer protocol existing at the network, transport and session layers of the International Standards Organization (ISO) open system interface (OSI) reference model for communication, which will be described below. There is no master-slave relationship between communicating entities in the establishment, maintenance or use of a session between a pair of Devices. This is in contrast to the characteristics of essentially all I/O channels where the channel controller at the host processor is the master and the fundamental controller of all communications over the channel. In the IONET protocol there is no functional distinction at the level of the control functions or the byte stream communication between any Devices other than as may be constrained by specific capabilities of those Devices.

The OSI model shown in FIG. 9 is useful for describing communication systems, including networks. In theory it is possible to replace the functionality of any of the layers with equivalent functionality implemented in a different manner and all of the other layers will remain unaffected and will operate properly in the system. The communication between one I/O device, 176a, and another I/O device 176b over the communication medium such as the cable 170 is described on the basis of seven layers or levels, each of which involves a certain level of functionality within the communication protocol. The lowest level is the physical layer 220.

The physical layer 220 involves the physical connections to the communication medium 170, and the physical signaling such a voltage levels in an electrical system, optical modulation in a fiber optic system, and radio frequency modulation in a microwave system, for example. In an electrical system, the physical layer is represented by bit streams present on the communication medium.

The next layer up is the link layer 222, sometimes called the data link layer. The data link layer 222 is the layer in which the physical delivery of raw data between Nodes on the network is accomplished. The physical signaling protocol, including link information, synchronization information, error correction information, block sizes, framing, etc. are conducted at this level. In most networks, the link level 222 is the level at which fundamental communication errors are able to be detected and either corrected or retransmissions requested. Communication between a pair of Nodes on the network depends on compatible implementation of data link layers. In summary, the link layer establishes, maintains and releases data links and is used for error detection and physical flow control.

The third layer is the network layer 224. The network layer 224 relates to the routing of information through the network, including addressing, network initialization, error detection and recovery, and to the switching, segmenting and blocking of the information. Sometimes acknowledgement of raw delivery data is accomplished at the network level, and sometimes it is accomplished at the link level.

A communication aspect which has not been directly addressed in the OSI model in an explicit layer refers to the means by which logical arbitration of the right to transmit at the physical layer is accomplished. OSI would normally place this arbitration on the link layer 222, but sometimes it is placed elsewhere. For purposes of the present disclosure, media access control is considered to be a link level function.

The next level up is the transport layer 226. The transport layer relates to the transparent data transfer, end-to-end control, multiplexing, mapping and the like. The data delivery implies reliable delivery, as opposed to a best effort to deliver the data which must be accounted for in the layers below the transport level. At the transport level, it is assumed that the data has been communicated in a reliable manner, and such things as the retransmission of missing data, reordering of the data delivered out of order, recovery from transmission errors, etc. has been corrected at or below the transport layer. In effect, the data input and output at the transport level 226 and in the higher levels is data which is meaningful to the computer system a opposed to raw data formatted appropriately for the network.

The fifth level is the session level 228. The session level 228 utilizes the delivery of information from the transport level to group pieces of data as associated with a given activity referred to as a session. Sessions occur between two entities at various locations on the network. At a given time, single Nodes on the network may be involved in multiple sessions going to a plurality of other Nodes, and many sessions may be multiplexed over the same network. However, the session layer services provide for the end-to-end delivery of data associated with a given logical activity without interference by data from other activities.

Level six is the presentation layer 230. The presentation layer 230 relates to the interface between the session level 228 and the application level 232 at level seven. The application level 232 is where the actual data is applied to or received from the I/O device (176a or 176) at each end of the communication. The presentation level 230 is essentially one of presenting the data in an acceptable form suitable for use in the application level 232 without having to compromise the network related integrity of the session layer 228. The presentation layer 230 therefore relates to data interpretation, format and code transformation, while the application layer relates to user application processes and management functions.

The activities for both the LAN and the IONET channel functionality discussed below exist at the session layer and below. No further discussion of the presentation and application layers is made because of the fact that these layers are strictly system, physical device and/or user application specific.

The byte arrangement of an IONET data packet 240 is illustrated in FIG. 10, and in FIG. 11 this IONET packet is broken down into the hierarchical levels which correspond to the OSI model illustrated in FIG. 9. Not included in the IONET packet shown in FIG. 10 is an alert burst 242 which is generated in a RIM by the controller 196 (FIG. 8) to identify the beginning of a packet. The alert burst 242 consists of six sequential "1" bits, and occurs at the physical level as is shown in FIG. 11. The remaining part of the information in the physical level packet 244 is a set of 8-bit bytes containing link level information 245.

In the link level packet 245, the RIM transmits a start of header (SOH) byte which is a character marking the beginning of an ARCNET data packet. After the SOH byte 246, the RIM transmits a source identification (SID) byte 248 indicating the RIM ID of the Node which is sending the packet. The next two following bytes are repetitions of a destination identification (DID) byte 250. The DID bytes 250 indicate the RIM ID of the Node to which this packet is addressed or destined. The DID byte appears twice for error control and reliability reasons in an ARCNET LAN. The next following byte 252 is encoded to identify the packet length (number of network level bytes), and is generally referred to in ARCNET terminology as a continuation pointer (CP). The ending two bytes of the packet are a 16-bit cyclical redundancy check (CRC) 254. The CRC bytes 254 are employed by the RIM for purposes of detecting transmission errors.

The SOH 246 at the beginning, and the CRC 254 at the end, of the link level packet 245 are normally not considered part of the ARCNET packets because they are both generated and checked by the network interface hardware (e.g., the ARCNET controller 196) and never appear in the packet buffer (RAM 208, FIG. 8) of the RIM. The remaining bytes of the header of the link level packet 245 do appear in the packet buffer, although the network hardware supplies the SID 248 on outgoing packets regardless of the value in the packet buffer. The DID for each receiver will always equal the RIM ID or will be zero for broadcast packets (which are received by all Nodes). Furthermore, only one of the two DIDs 250 is stored in the packet buffer of the RIM, so only one DID 250 is a part of the ARCNET header portion 258 of the IONET packet 240. The IONET packet 240 shown in FIG. 10 follows this convention for purposes of illustration.

Normally, the typical ARCNET packet is 256 data bytes, or less, in length. However, it is also possible to communicate over the ARCNET LAN in long data packet lengths of up to 512 data bytes. In the long data packet mode, the CP 252 is 2 bytes long making the link level header six bytes in length rather than the five shown.

The network level information 257 following the CP 252 and preceding the CRC 254 is information which is passed from the controller 196 (FIG. 8) up to network level interpretation within the low level software or firmware of the computer system or POU adapter.

The network level packet 257 commences with a 7 byte header starting with the system code (SC) byte 256. The SC byte 256 is a common feature of all ARCNET packets and indicates the type of packet. The system code is used to identify and distinguish different types of communication protocols which might be in use simultaneously.

When the SC 256 in the ARCNET header 258 identifies an IONET packet through the code unique to IONET packets, the following 10 bytes 260 constitute the IONET header of the IONET packet 240. The IONET header 260 provides network level and transport level information and indicates how the remaining data area 262 is to be divided between administrative information 264 and byte stream information 266.

The division of the data area 262 into the administrative portion 264 and the byte stream portion 266 permits what is called out-of-band signalling by providing a distinct separation of the administrative information used to control the I/O device and the POU adapter or report status of the I/O device or the POU adapter, from the byte stream information 266 which is used to communicate information to and from the I/O device. The administrative information 264 may be supplied by, inspected by, or modified by IONET controlled components, but the byte stream information 266 is always handled in a transparent manner and is therefore delivered to the destination I/O device unmodified from the source value which constituted it at the time of transmission.

The first six bytes of the IONET header 260 are a part of the network packet 257. Those bytes are, in order, a transmitter status byte (TXSB) 268, a receiver status byte (RXSB) 270, a 2 byte source subaddress (SSA) 272, and a 2 byte destination subaddress (DSA) 274. The remaining 4 bytes of the IONET header 260 are contained within the transport level packet 276. The first byte of the transport level packet 276 is a byte indicating the packet function (PFN) 278. The next following byte 280 is not currently used but is reserved for future expansion. The third byte is an administrative length value (ADL or ADLNG) 282. The function of the ADL byte is to identify the length of the administrative information 264 of the data area 262. The last byte 284 is a byte stream length value (BSL or BSLNG) 284. The BSL byte 284 identifies the length of the byte stream information 266 of the data area 262. The ADL 282 and BSL 284 bytes are both employed because the combined length of the administrative information 264 and the byte stream information 266 can be less than the total length of the network level packet 257. In such cases the remaining bytes in the network level packet 257 beyond those defined for the data area 262 are not used. The length of the data area 262 may be up to 242 bytes in short packet mode or up to 497 bytes in long packet mode. When long packet mode is utilized, the CP 252 extends for 2 bytes in length and both the ARCNET header 258 and the IONET header 260 extend for one additional byte other than that illustrated in FIG. 10.

More details regarding the ARCNET header 258 and the IONET header 260 are illustrated by the chart shown in FIG. 12, which illustrates the name of each of the fields within each header, the bit layout from the least significant bit on the right to the most significant bit on the left of each field, and summarizes the uses of each field.

The source identifier (SID) 248 in the ARCNET header 258 of each incoming packet is checked by the RIM at each receiving Node whenever a session is in progress. All packets sent by the active session partner are accepted for interpretation and processing. All packets received from the RIMs at other Nodes, except those containing certain level control functions, are discarded, and the RIM receiver is immediately re-enabled. When no session is in progress, all incoming packets are interpreted, but only those containing certain network and transport level control functions relating to establishing a session and reporting or setting parameters or statistics are accepted for processing.

The destination identifier (DID) 250 of the ARCNET header 258 is either equal to the RIM ID of this node, or is zero for broadcast messages. RIMs used on the IONET channel are always configured to accept broadcasts. Only Locate commands, described below, are accepted as broadcasts by Devices. Any other broadcasts received, even if they have the IONET system code (SC), are discarded by the Devices.

The continuation pointer (CP) 252 of the ARCNET header 258 is used to determine the length of the IONET packet. The CP is one byte long for short packet mode, and contains the packet length subtracted from 259. The CP is two bytes long, with the first byte set to zero, and the second byte set to the packet length subtracted from 516, for long packet mode.

The system code (SC) 256 of the ARCNET header 258 may be any particular coding to identify the IONET protocol, and one exemplary coding is illustrated in FIG. 12. Incoming packets with other system codes (other than a diagnostic system code) are discarded by all Clients and are handled by other protocol code, if at all, by all Servers.

The IONET header 260 is used by all the transmitter and receiver state machines to control the byte stream communication over the communication medium of the network, to direct the packet contents to the correct logical I/O device, and to determine the contents of the data area 262 (FIG. 10) of the packet.

The transmitter status byte (TXSB) 268 of the IONET header 260 contains information relating to the overall usage of the IONET packet and the state of the transmitter state machine which sent the packet. As is shown in FIG. 12, the immediate field (Imm.) of the TXSB byte is encoded to distinguish between immediate priority packets (Imm.=1) and normal priority packets (Imm.=0). Packets for expedited delivery are referred to as immediate packets. Outgoing immediate packets are transmitted ahead of pending normal priority packets, and incoming immediate packets are processed as soon as they are received, ahead of any normal priority packets waiting in receive buffers and (typically) ahead of the rest of the normal priority packet in progress (if any) when the immediate packet arrived.

The operation field of the TXSB contains a code for the transport level usage to be made of the IONET packet. The transport level uses which may be encoded in the operation field are: NOP, used for keep alive messages; IDLE, which indicates a transmitter waiting (TW) state; DATAF, which indicates a transmitter active (TA) or immediate transmitter active (ITA) state on the final (or only) packet in the transmission group, where the PFN 278 field controls the usage of the data area; DATAI, which indicates a TA state on initial or intermediate packets in the transmission group, where the PFN 278 field controls the usage of the data area; CONTROL COMMAND which is further encoded in the function field of the TXSB byte; and CONTROL REPLY which is further encoded in the function field of the TXSB byte.

The sequence number or function field of the TXSB byte 268 contains the sequence number of the packet being transmitted when the operation field is encoded for all functions except CONTROL COMMAND and CONTROL REPLY functions. When the operation field is encoded for CONTROL COMMAND or CONTROL REPLY, the control function is encoded in the function field of the TXSB as is shown in the following chart:

Servers (S) or both (A), which may receive each type of IONET packet. The "Session" column indicates whether the command is accepted either in and out of session, indicated by "E", or whether the command is accepted only in out of session indicated by "0", or whether the command is accepted only when in session, indicated by "I". The "Mode" column indicates whether the packet must be sent as an immediate packet, indicated by "I", whether the packet must be sent as a normal priority packet, indicated by "N", or whether the packet may be sent in either normal or immediate mode, indicated by "E". In the cases of almost all control functions, a reply packet is generated by the recipient Device and is sent back to the Device which sent the original control command. The TXSB, PFN, and LNG columns under "Reply" provide the control encodings and lengths for the CONTROL REPLY functions sent in response to the various CONTROL COMMANDS.

The receiver status byte RXSB 270 of the IONET header contains information relating to the state of the receiver state machine at the Device which transmitted the packet. The high order bit or immediate field is set to distinguish between acknowledgements of immediate packets and normal packets. The acknowledgement field (ACK) encodes the acknowledgement to the last packet received by the Device by sending codes such

| CONTROL FUNCTION | RCVD BY | COMMAND | | | REPLY | | | MODE | SESSION |
|---|---|---|---|---|---|---|---|---|---|
| | | TXSB | PFN | LNG | TXSB | PFN | LNG | | |
| Forward | S | E1 | 00 | 40 | F1 | 00 | 15 | I | 0 |
| Connect | A | E2 | 00 | 48 | F2 | 00 | 20 | I | 0 |
| Redirect | A | E3 | 00 | 17 | F3 | 00 | 15 | I | I |
| Disconnect | A | E4 | 00 | 14 | F4 | 00 | 15 | I | I |
| Report Device Parameters | A | E5 | 00 | 14 | F5 | 00 | 52 | I | E |
| Report Statistics | A | E6 | 00 | 14 | F6 | 00 | 33+ | I | E |
| Report Interface Parameters | C | E7/67 | 00 | 14 | F7/77 | 00 | 16+ | E | E |
| Set Device Parameters | C | E8 | 00 | 43 | F8 | 00 | 15 | I | E* |
| Set Interface Parameters | C | E9/69 | 00 | 15+ | F9/79 | 00 | 15 | E | E** |
| Locate | A | EA | 00 | 27 | PA | 00 | 15 | I | E |
| Resynchronize | A | EB | 00 | 14 | FB | 00 | 15 | I | I |
| Flush Buffers | A | Cp | 81 | 14 | None | — | — | I | I |
| Run Extended Diagnostics | C | 4n/Cp | 82 | 14+ | 4n/Cp | C2 | 15+ | E | I |
| Report Status | C | 4n/Cp | 83 | 14 | 4n/Cp | C3 | 20+ | E | I |
| DATAFn | A | 4n/Cp | 00 | 15+ | None | — | — | E | I |
| DATAIn | A | 5n | 00 | 15+ | None | — | — | N | I |
| IDLEn | A | 2n | 00 | 10/14 | None | — | — | N | I |
| NOPx | A | 8x/0x | xx | 10/14 | None | — | — | E | I |

*This command is only accepted when the configuration lock is not set.
**This command is only accepted from other than the session partner when the configuration lock is not set.

Referring to the chart above, a CONTROL COMMAND is present in the operation field of the TXSB 268 when the TXSB value begins with "E" or "6" on the chart. The function achieved by the particular CONTROL COMMAND is indicated in the "Control Function" column. Data functions encoded in the operation field of the TXSB are indicated by TXSB values which begin with "4", "5" or "C". These five functions, final data transfer (DATAF), initial/intermediate data transfer (DATAI), flush buffers, run extended diagnostics, and report status, are encoded into the type code field of the PFN byte 278 in addition to the TXSB. The "LNG" field shows the length required or allowed for each type of control function. The "Received By" column indicates the class of Device, either Clients (C), as, NOP; BUSY, which indicates a receiver waiting (RW); or an immediate receiver waiting (IRW) state; and READY, which indicates a receiver active (RA) or an immediate receiver active (IRA) state. The fault field is set =1 in Clients if a detectable internal fault condition local to the Client hardware or firmware has occurred, and is set to zero otherwise. Servers always set the fault field to zero. The sequence number field contains the sequence number of the packet being acknowledged.

The source subaddress (SSA) 272 of the IONET header identifies the specific source Device at the Node from which the packet is sent. The destination subaddress (DSA) 274 identifies a specific destination Device at the Node which is receiving this packet.

The packet function PFN 278 defines the usage of the data area 262 (FIG. 10) of the IONET packet in cases where the TXSB indicates that this is a "data" packet by an operation code of "DATAI" or "DATAF". The type code field of the PFN 278 encodes general usage of the packet to indicate a data transfer, where the data area contains byte stream and administrative data for use by the I/O device; or a Client control command, where the data area contains control information for use by the Client firmware; or a Client control reply, where the data area contains control information sent in reply to a control request.

The bits designated ASL and ADL of the PFN 278 are used to hold the most significant bits of the length values in the ADLNG 282 and BSLNG 284 bytes described below.

The function code field of the PFN 278 is always set to zero for data transfer functions. For Client control commands and Client control replies the Client function is encoded to indicate the flush buffers, run extended diagnostics, and report status functions previously identified in the above chart.

The address length (ADLNG) 282 and byte stream length (BSLNG) 284 bytes form a data area descripter. The data area descripter defines the usage of the data area 262 (FIG. 10) of the IONET packet. The value within the ADLNG field 282 specifies the length of the administrative information 264 (FIG. IO). If the administrative information length is not zero, the administrative data begins immediately after the data area descripter 282 and 284 and extends for the specified number of bytes. Bit 4 of the PFN byte 278 serves as the most significant bit of the ADLNG 282 byte to allow for ADLNG values greater than 255 for use with long packet mode.

The number encoded in the BSLNG field 284 specifies the length of the byte stream information portion 266 (FIG. IO) of the data area 262. If the value within the BSLNG byte is not zero, the byte stream area begins at the byte following the administrative area, or follows the data area descripter 282 and 284 if the ADLNG field 282 is zero. The byte stream information extends for the number of bytes specified in the field 284. Bit 5 of the PFN byte 278 serves as the most significant bit of the length value specified in the BSLNG field 284 to allow for BSLNG values greater than 255 for use with long packet mode.

The most frequent packets sent over the IONET channel are those which transfer byte stream data for use by the destination I/O device. Control function packets are those whose contents are interpreted within the support software or firmware of the IONET Server or IONET Client, and are not seen by the I/O device. The IONET control function packets are those identified in the above chart and are identified in the TXSB 268, as described in conjunction with FIG. 12.

The IONET control function commands and replies are available at several levels. Network level control functions relate to Nodes on the IONET channel and are independent of session activity. Transport level control functions are used to establish, control and terminate sessions. Session level control functions are used to control the interface to the I/O device and are only useable when a session is in progress, with the exceptions noted. Session level byte stream functions transfer data, control and status information to and from the attached I/O devices.

Control command messages are always sent using short IONET packets. All CONTROL COMMANDS require the recipient thereof to send back a CONTROL REPLY packet. Thus, control functions involve a distinctive handshake between the transmitter state machines of the two communicating Devices. This handshake does not involve the receiver state machines. The generalized details, applicable to each CONTROL COMMAND and CONTROL REPLY follow.

The positive acknowledgement of a CONTROL COMMAND in the form of a CONTROL REPLY packet is always required, independent of the transmit packet count. No further transmissions (other than retries) are made until the corresponding CONTROL REPLY has been received. Sequence numbering is neither required nor used for control function packets. Control function acceptance is encoded in a completion code byte which appears as the first byte of administrative data in all CONTROL REPLY packets. Exemplary types of completion code values which are encoded into the administrative area 264 of the data area 262 of each IONET packet 240 which transmits the control reply may be as follows, among others: Successful completion of the control function; the control function is not supported by the destination Device; the control function is rejected due to the state of the receiver; the control function is rejected because the Device is not in session; the control function is rejected because the Device is already in session; the control function is rejected because a configuration lock associated with the Device is set; and there is a specification error in the CONTROL COMMAND parameter(s).

As is seen in the above chart, the network level control functions include report device parameters, report statistics, report interface parameters, set device parameters, set interface parameters, and locate. There is also a null function, not shown in the above chart, which is ignored by the recipient without generating either an error or a reply. These network level control functions are accepted by the IONET Nodes at any time, whether or not a session is in progress. These control functions do not have to originate at the SID of the active session partner to be accepted during a session.

The report device parameters CONTROL COMMAND causes the IONET Device to generate a CONTROL REPLY packet containing information on the type and status of the I/O device. The report device parameters command is recognized by all Devices, is accepted whether or not a session is in progress, and is accepted from any source when the Device is in session, not just from the session partner. Some of the information being reported relates to attributes of the Node. This information is reported on a uniform basis for all Devices. The report device parameters command is not accepted from broadcast packets due to the large amount of network traffic which would be generated, the lack of a broadcast capability which refers to subaddresses, and the inability to determine if responses have been received from all devices. The report device parameters command is sent as an immediate packet.

The format of the CONTROL REPLY packet transmitted in response to a report device parameters CONTROL COMMAND may advantageously include in the administrative information section 264 of the data area 262 (FIG. 10): an indication of the completion code described above, type code used to identify Clients or Servers and the type of I/O device interface 182 (FIG. 6) associated with the Device, a packet length and transmit packet count which indicates the maximum number of DATAI packets allowed before a DATAF packet is required, and a session initiation type byte. The session initiation type byte indicates a limitation on an IONET Device which limits its communication to predetermined Clients or Servers in a predetermined session. This type of restricted communication capability is advantageously employed for the purpose of limiting access to certain Devices and requiring certain levels of security in order to obtain communication between particular Devices.

The report statistics CONTROL COMMAND causes the Device to which the command is addressed to generate a CONTROL REPLY packet containing statistics information gathered by the Device. This command is recognized by all Nodes at subaddress zero, and may be recognized by all Devices. This command is accepted whether or not a session is in progress, and is accepted from any source when the Device is in session, not just from the session partner.

Some of the information being reported relates to attributes of the Node, and is reported in the same form for all Devices at that Node. This command is not accepted from broadcast packets due to the large amount of network traffic which would be generated, the lack of a broadcast capability which refers to subaddresses, and the inability to determine if all responses have been received. This command is sent as an immediate packet.

The report interface parameters CONTROL COMMAND causes the Client Device to generate a CONTROL REPLY packet containing information on interface status and related modal state of the Device. The information is reported from the set of parameters stored in RAM memory associated with the Device and currently in use by the Device. These values may vary from the parameter values stored in non-volatile memory in the Client under certain conditions. This command is recognized by all Clients in a Device specific manner, is rejected by all Servers, is accepted by Clients whether or not a session is in progress, and is accepted from any source when the Client Device is in session, not just from the session partner.

The report interface parameters command must be sent in an immediate packet by Devices other than the session partner, and may be sent in either the normal or immediate packet form by the session partner. Certain bytes in the administrative information 264 of the data area 262 (FIG. 10) of the IONET packet may be devoted to communicating values which are different than those parameters stored in RAM memory.

The set device parameters CONTROL COMMAND causes the Client Device to store new values into its non-volatile memory. This command is only accepted by Client Devices and only when the configuration lock is not set in which case the command is accepted from any source, not just the session partner (if any). This command must be sent as an immediate packet.

Additional information contained within the administrative information section of the data area of the IONET packet can include bytes which identify external equipment type, a Device name, the session initiation type of the Device, the type specific service class of the Device, the identification of a predetermined partner or remote session password, and the configuration lock status.

The set interface parameters CONTROL COMMAND causes the Client Device to set new values for interface control and the related modal state. The new values are applied to the interface and are stored in RAM within the Client. These values may also be stored in non-volatile memory within the Client. This command may also be used to recall the values from non-volatile memory into RAM.

The set interface parameters command is recognized by all Clients in a Device specific manner, is rejected by all Servers, is always accepted by Clients from the session partner and is accepted by Clients from any source whether or not in session if the configuration lock is not set.

The set interface parameters command must be sent in an immediate packet by Devices other than the session partner, and may be sent in either a normal or immediate packet by the session partner. Additional information contained in the administrative information section of the IONET packet relates to RAM or non-volatile memory control for writing parameters from the packet into RAM or into both RAM and non-volatile memory and for recalling parameters from non-volatile memory into RAM. Other information in the administrative information section relates to device type specific interface parameters.

The locate CONTROL COMMAND may be sent as a broadcast by Devices attempting to establish a session in order to determine the RIM identification number and subaddress of a desired destination Device attempted to be located by the use of a name assigned to it. If multiple replies are received all but the first of these replies is ignored. The locate command is recognized by all Nodes at subaddress zero, is accepted whether or not a session is in progress, and is accepted from any source when the Device is in session, not just the session partner. The locate command is the only control command function accepted from broadcast packets.

A locate command must be directed to subaddress zero of the destination. The source subaddress of the control reply packet identifies the specific Device at the responding Node which has been located by transmitting its identification number. If multiple Devices at the responding Node match the specified name, then multiple reply packets are generated. If no Devices at Nodes receiving the locate packet match the specified name then no reply is generated.

The expiration of a timeout interval while waiting for a reply to a locate command is an indication that no active Device has a matching name. The locate command must be sent as an immediate packet. The name of the responding Node in encoded in the administrative information section of the IONET packet. The locate packet also contains a desired service class. If this value is zero, only the name must match, otherwise both the name and service class must match. The completion code in the reply to a locate command distinguishes between the case where a Device is able to accept a connect command for the specified service class, and the case where the Device cannot accept such a connect command.

As shown in the above chart, the transport level control command functions include connect, forward, disconnect, redirect and resynchronize.

The connect CONTROL COMMAND establishes a session, if none is in progress and is rejected if received when a session is in progress. Either Clients or Servers can initiate the session by sending the connect control command. Connect requests to Servers should generally be sent to the subaddress returned by the locate command for the desired session partner's name (or to subaddress zero). The Server may redirect session communication to a different subaddress by sending an appropriate value for the source subaddress (SSA) 272 (FIG. 12) field of the reply packet. Session traffic should subsequently be directed to the destination subaddress obtained from the SSA field of the reply packet.

The connect command must be sent as an immediate packet. Preferably the administrative information section of the connect CONTROL COMMAND packet includes information relating to the type of Device, its hardware and firmware or software revision level, its protocol version support, its maximum subaddress, its packet length and transmit packet count, its incoming transmit buffer length, its minimum incoming transmit length, the time before forcing an incoming packet to be sent by Clients, a source external equipment type, a source Device name, a source session initiation type, source service class, and a session initiation password.

If the connect command is accepted, a CONTROL REPLY packet is generated whether or not the connection request is successful. If the completion code field contains an indication that the session has not been successfully established, the completion code specifies the reason for the failure. Some of the reasons which may be specified in the completion code for the failure to successfully establish the session are the control function has been rejected because the Device is already in session, there is a specification error in the control function parameters, the replying Device does not support the particular protocol version or the hardware revision level or the firmware or software revision level requested, the Device is in an unavailable service class, the Device is not configured for remote initiation, or there may be a remote password or name mismatch. In addition, the other administrative information in the CONTROL REPLY packet may relate to the protocol version to use, the packet length to use, the transmit packet count to use, the incoming transmit buffer length, the minimum incoming transmit length, and the time before forcing the sending of an incoming packet.

The forward CONTROL COMMAND configures a Server Device to be a packet forwarder for inter-network linkage. Once the forwarding is established, the Device neither interprets nor acknowledges IONET packets, but simply forwards them in both directions to the established link. Since it is not possible to communicate with a forwarding Device, all configuration in this Device must be done prior to sending the forward command. The forwarding Device does not operate transport control state machines, but does monitor the reverse channel for a disconnect CONTROL REPLY code to know when to terminate forwarding. To avoid loss of resources when communication is lost in a disorderly manner, forwarding is terminated, and the Device goes into an unconnected state, if no communication is received in either direction for a timeout interval specified in the forward command which established the link.

Forward requests should generally be sent to subaddress zero. The forwarder may redirect communication to a different subaddress by setting an appropriate value for the SSA field 272 (FIG. 12) of the reply packet. Communication should subsequently be directed to the destination subaddress obtained from the SSA field of the reply packet.

The forward command is rejected if received when a session is in progress.. Devices which are not able to function as packet forwarders (including all Clients) always reject this command. Either Clients or Servers can initiate forwarding by sending a forward command. The forward command must be sent as an immediate packet. The administrative information section of the forward IONET packet preferably includes the name of the destination network, the name of the desired destination device, the desired class of service, and the connection timeout periods.

The destination Device of the forward command accomplishes a locate function on the destination network for the designated destination device to determine the RIM ID and the subaddress to which communications should be forwarded.

If the forward command is accepted, the reply packet is generated whether or not the forwarding request is successful. If the completion code field contains any code indicating that the forwarding has not been successfully established, the completion code specifies the reason for the failure. The reasons for the failure may be the same as those which have previously been described.

A disconnect CONTROL COMMAND terminates a session. The disconnect command is rejected if no session is in progress. Either Clients or Servers can initiate a disconnect command. The disconnect command must be sent as an immediate packet.

A redirect CONTROL COMMAND is sent simultaneously to the session partners of two active sessions from a Node which desires to redirect traffic of those two sessions so that the partners in these sessions communicate with each other and no longer with the Node sending the redirect command. This command must be sent in an immediate packet. The administrative information section of the redirect packet includes the new destination identification and the new destination subaddress. The completion of a redirect command involves resynchronization, as described below.

A resynchronize CONTROL COMMAND causes the transmitter and receiver state machines at each end of a session to reset to their state upon establishment of a session. This allows communication to be re-established without disconnection and reconnection in cases where sequence number or other synchronization between the two devices has been lost.

Either Clients or Servers can send a resynchronize command when a session is in progress. The resynchronize command is rejected if no session is in progress. The resynchronize command must be sent as an immediate packet.

The session level control functions include flush buffers, run extended diagnostics, and report status. These session level control functions are interpreted by the interface control firmware in Clients. These control functions are not supported by Servers, with the exception of the flush buffers function. The details of most of these commands are Client-type specific, and only their common aspects are discussed below. Note that these session level control functions are sent in packets whose TXSB values indicate data transfer (DATAF), but whose PFN values indicate client control request and client control reply.

The flush buffers control function causes the recipient to discard any packets or partial packets present in receive buffers within the POU adapter or low level software. The flush buffers command is accepted by any Device with a session in progress, and is ignored when no session is in progress. The flush buffers command is sent as an immediate packet.

The run extended diagnostics control function causes the Device to perform diagnostic functions and report on their results. These diagnostic functions may be identical to those performed by default at power on, or may be extensive or specialized tests. This command is recognized by all Clients in a type specific manner. Clients which do not implement extended diagnostic functions report a successful completion of this command. This command is recognized by all Clients, is rejected by all Servers, and is accepted only when a session is in progress. The run extended diagnostics command may be sent in either a normal or immediate packet. The administrative information section of the IONET command packet may include information regarding the diagnostic parameters, and the administrative information section of the IONET reply packet includes information regarding the diagnostic results.

The report status control function causes the Device to generate a reply data packet containing information on the I/O interface status of the Device. This command is recognized by all Clients in a type specific manner. This command is recognized by all Clients, is rejected by all Servers, and is accepted only when a session is in progress. The command may be sent in either a normal or an immediate packet. The minimum response in the reply IONET packet consists of standardized interface control and status discussed below in conjunction with session level byte stream functions.

The session level byte stream functions include DATAI, to transfer initial or intermediate data packets; DATAF to transfer final or only data packets; IDLE to place the receiver state machine into a stopped state; and NOP for keep-alive messages. Use of these functions is discussed below in conjunction with the transport control state machines.

The administrative information portion of the data area of the DATAI and DATAF IONET packets is used for a standardized interface control and status facility. The advantage of a standardized control and interface facility is that it provides a means for directly accessing Device control and status information in a manner which is independent of the physical I/O device type. The I/O device type independence permits a single implementation of low level software at a Server to communicate with and control virtually all types of I/O devices.

The administrative data area of the DATAI and DATAF IONET packets is used to hold an input status word (ISW) which reports the state of the external interface control input signals and provides an indication of generic power on/off and generic ready/not-ready status; a status mask word (SMW) which selects which input status changes are of interest to the session partner and should cause reporting in this administrative data area; and an output control word (OCW) which specifies settings of external interface output control signals.

All DATAI and DATAF packets used for data transfer are interpreted as follows: if the administrative data area is null, no interface control or status changes are occurring; if there are exactly two bytes of administrative data, these bytes are the ISW; if there are exactly four bytes of administrative data, these bytes are the ISW followed by the SMW; if there are exactly six bytes of administrative data, these bytes are the ISW, the SMW and the OCW, respectively; and if there are more than six bytes of administrative data, the first six bytes are the ISW, the SMW, and the OCW, while the additional bytes are type specific.

To facilitate reporting or setting information in later words without affecting information in preceding words, the most significant bit of each ISW, SMW and OCW is a validity or enable bit. A word with its validity bit set to zero is ignored. For communication from Clients to Servers, the ISW reports external interface control input status, the SMW reports the current mask settings, and the OCW reports the current external interface control output settings. For communication from Servers to Clients the ISW is not used, the SMW is used to set the status mask value, and the OCW is used to set the external interface control outputs. For communication from Servers to Servers, the ISW, SMW and OCW are generally not used, and for communication from Clients to Clients these three words are generally ignored.

A strategy available from the present invention to obtain session level security for data message communication is based on the use of the SID to prevent a third Device from interferring with the communication between a pair of Devices participating in an IONET session. When a session is in progress, data and control packets are only accepted if their SID matches the SID of the Node which sent the original connect command function packet or which sent the reply to the original connect packet. In addition to being very simple and efficient to implement and requiring no extra hardware, this security technique provides a barrier against unauthorized communication from the other Nodes. This occurs because the ARCNET link level hardware prevents the transmission of an SID other than its established SID.

Sessions may be established and controlled by the use of passwords and configuration locks. A password is certain information established in the memory of a device. In order to establish a session, the connect command packet must originate from a Device which has a SID which corresponds to the password or is within a group of SIDs defined by the password. All clients maintain certain Device parameters in non-volatile memory. The contents of this non-volatile memory is subject to access and update by IONET control functions unless a configuration lock is set by another IONET control function. Once the configuration lock is set no changes may be made to the contents of the non-volatile memory until the configuration lock is cleared by human action accomplished at the Device, for example, operating a switch. Setting the configuration lock allows the Device configuration to be protected from unauthorized modification.

Clients can be configured for remote session initiation, in which case a Server must initiate the session. By protecting the configuration information file(s) at the relevant Server(s), users can be restricted from altering the location and/or the characteristics of the task which will initiate the session. Clients can be configured for predetermined session initiation, in which case the session partner is identified and fixed in the non-volatile memory of the Client. The configuration lock is set to prevent the user and the application hardware from changing the session initiation type and session partner. Because Clients configured for predefined sessions do not accept messages or session partner identifications from the user, predefined sessions provide the appearance of a direct, dedicated connection between a single server and a single client despite the multicontext, multiplexed nature of the communication medium. This type of dedicated predefined point-to-point communication on a multiplexed medium is not typically available on conventional I/O channels except through the use of dedicated point-to-point single use cabling. Remote session initiation requests arriving at any Device may require a password if the session initiation type is not predefined, thereby allowing Devices to be configured to exclude unauthorizing incoming access. In the case of point of use adapters, the remote session password may not be read out or modified if the configuration lock is set.

The transport control state machines operate to provide the functionality necessary for communication over the IONET communication channel, and operate in response to the IONET protocol described above. The communication is a full-duplex logical link, at the session level, between pairs of communicating Devices. Each logical link involves two transmitters and two receivers, each of which is controlled by a simple state machine. Every session has an instance of both transmitter and receiver state machines operating at each Node participating in the session.

The purpose of the state machines is to synchronize byte stream delivery, acknowledge successful receipt of packets, detect and re-transmit missing or lost packets, detect and ignore duplicate packets, provide periodic "keep alive" packets during intervals when no data is being communicated, provide flow control which prevents transmission of packets for which no receive buffer is available, and avoid unnecessary flow control activities by stopping communication during periods when there is no data to send and/or no buffer space to receive the data, and thereafter restarting communication when these conditions are remedied.

The TXSB of the IONET header communicates the state of the transmitter state machine which is sending the packet to the receiver state machine which is expected to receive the packet. The RXSB communicates the state of the receiver state machine at the Device which is sending this packet (not the receiver state machine which is receiving the packet) to the transmitter state machine at the Device which is the destination of this packet (not the transmitter state machine which is sending this packet).

The acknowledgement to each packet appears as the RXSB of the next packet sent by the transmitter at the Device which received the packet being acknowledged. During periods of bi-directional communication this "piggybacking" arrangement of acknowledgements conserves network bandwidth. During periods of unidirectional communication, there will be no data packets going in the reverse direction; however, packets containing the acknowledgement will be generated. Whenever either the transmitter state machine or the receiver state machine has a status change to report, a packet is sent. If one of the state machines has nothing to send at that time, it reports no status using a "NOP" code in its status byte.

Maximum transmit packet counts are established between session partners at the time a session is established. These counts, which do not have to be the same for the two communication directions, specify the maximum number of data packets which the transmitter may send without an acknowledgement from the receiver. (Command packets are always sent one at a time with replies for each command.) The transmitter must retain copies of the entire group of data packets until acknowledgement is received to allow for the possible need for retransmission. If a reception error or synchronization error occurs, this status is reported immediately. Immediate data packets and all command packets are acknowledged when received, independent of the transmit packet count. Normal priority data packets can be designated to generate positive acknowledgement. The receiver must have sufficient buffers to hold the maximum number of unacknowledged packets before indicating to the transmitter that it is ready to receive.

The default transmit packet count is one packet, which results in positive acknowledgement of every packet transmitted. The largest allowable transmit packet count is 15, and is limited by the use of a 4-bit sequence number to maintain packet delivery synchronization. The transmit packet count used by any Device should not exceed a value one less than the number of packets the associated receiver state machine can buffer without having to inhibit the RIM receiver. The higher the transmit packet count, the less network bandwidth and processing time is used in sending acknowledgements, and less time must be elapse between successive transmissions; but a greater number of buffers must be retained by the transmitter state machines to handle the possible need for re-transmission.

The transmitter and receiver state machine operations are relatively straightforwardly implemented in either hardware or software. The software implementation is preferable because of economics, and because a hardware implementation would result in an unacceptably large physical size for a POU adapter, for most applications.

FIGS. 13 and 14 show the general state transitions in terms of what conditions move the transmitter and receiver state machines between the states. The conditions which cause the state machines to remain in the same state are characterized by either complex determinations based upon received information as shown in the following state transition tables of FIGS. 15, 16, 17 and 18, or by receipt of packets which are outside the protocol and are therefore ignored leaving of the machine in the same state.

FIG. 13 shows the five basic transmitter states: TA (Transmitter Active) when the transmitter has information to send and is in the process of sending or attempting to send it; TW (Transmitter Waiting) when the transmitter is able to transmit data as far as flow control is concerned, but has nothing to transmit, and therefore it is waiting on internal conditions within its Node to make more data available; TS (Transmitter Stopped), indicating that the transmission has been stopped due to transport level flow control, that is a busy indication from the receiver state machine at the opposite end of the session; ITA (Immediate mode Transmitter Active) entered from the normal mode when there are immediate packets to send; and ITS (Immediate mode Transmitter Stopped), which is equivalent to TS (Transmitter Stopped) but occurring due to transport level flow control while in immediate mode. The drop back from the immediate mode to the normal mode is implicit as soon as all the immediate packets have been sent. The state indicated as "Out of Session" is not strictly speaking a state, but rather a condition where the state machine does not operate because no session is in progress.

The Out of Session condition is entered after reset of the channel or the Node, as well as a result of the end of the session either through the disconnect control function or a time out which terminates the session.

When a session is established, the transmitter state machine enters the TS (Transmitter Stopped) state because of the fact that until the receiving device has indicated it is ready to receive data, the transmitter has to assume the receiver may be busy. Accordingly, within any session, the first thing that is communicated in the session is a ready indication from the receiver to the transmitter to take the transmitter out of TS state. The remainder of the states and conditions which cause the transitions between states are understood from the diagram of FIG. 13.

FIG. 14 shows the five basic receiver states: RA (Receiver Active) when the receiver is receiving information; RW (Receiver Waiting) when the receiver is able to receive data as far as flow control is concerned but is not actually receiving data and therefore is waiting for the data to become available; RS (Receiver Stopped), indicating that the transmission of data has been stopped as a result of an indication from the transmitter state machine at the opposite end of this session that no further data needs to be sent at this time; IRA (Immediate mode Receiver Active) entered from the normal mode when there are immediate packets to be received; and IRW (Immediate mode Receiver Waiting), which is the equivalent to RW (Receiver Waiting) but occurring due to transport level flow control while in the immediate mode. The drop back from the immediate mode to the normal mode is implicit as soon as each immediate packet has been acknowledged. The state indicated as "Out of Session" is not strictly speaking a state, but rather a condition where the state machine does not operate because no session is in progress. The out of session condition is entered after a reset of the IONET channel or the Node, as well as a result of the end of session either through the disconnect control function or timeout which terminates the session.

With respect to the receiver state machine diagram shown in FIG. 14, the states and the number and direction of transition conditions linking the states is identical to the transmitter state machine diagram of FIG. 13, except the transition from out of session state goes to the RW (Receiver Waiting) state rather than the RS (Receiver Stop) state on the establishment of a session. Note the pairings of states shown in FIGS. 13 and 14. Ordinarily, TA and RA are a pair for dealing with active communication. If the transmitter has nothing more to send, it indicates idle and goes to the TW state. The idle message from the transmitter places the receiver in the RS state. The receiver will be removed from the RS state by the transmitter becoming active again, which is a transition from TW back to TA. If the receiver runs out of buffers to hold incoming data, it indicates a not ready condition, going from RA to RW. This moves the transmitter into the TS state. What gets the transmitter out of the TS state is a ready indication from the receiver, which occurs when the receiver transitions from RW back to RA when free buffers are again available. When active communication is going on, both the transmitter and the receiver are in their active states, TA and RA. If the transmission has been suspended because the transmitter has nothing more to send, the transmitter is in TW and the receiver is in RS, whereas if the transmission has been stopped because the receiver has no space to put any more data, the receiver is in RW and the transmitter is in TS.

More specific details on the operation of the transmitter and receiver state machines are discussed below and in conjunction with FIGS. 15, 16, 17 and 18.

The transmitter state machine handles all outgoing packets for a given device, provides the transmitter status byte TXSB for all packets it handles, generates sequence numbers for outgoing data packets, matches acknowledgements to packets which have been sent, retransmits unacknowledged packets after a timeout has expired, generates keep-alive packets at predetermined time intervals during periods when no outgoing data is available, and breaks the connection if more than a greater second predetermined time period elapses without a status reply from the corresponding receiver state machine.

The normal mode transmitter states are shown in FIG. 15. The states are Transmitter Active (TA), entered when there is outgoing data to transmit and when the transmitter is awaiting the acknowledgement for transmitted packet(s); Transmitter Waiting (TW), entered when the last transmitted packet has been acknowledged and no further outgoing data is available; and Transmitter Stopped (TS), entered when the receiver has halted communication because no receive buffer space is available. The transmission of normal packets and of immediate packets are treated as independent activities. There is a semi-independent transmitter state machine for immediate packets, shown in FIG. 16, using ITA and ITS transmitter states. After reset, as well as when no immediate packet is pending or awaiting acknowledgement, the transmitter state machine is in normal mode, and uses TA, TW, and TS.

When presented with an immediate packet to transmit while in normal mode the transmitter state machine enters immediate mode in an ITA state and sends the packet. Once the immediate mode is entered the transmitter state machine remains in immediate mode until all pending immediate packets have been sent and acknowledged. At this time the transmitter state machine returns to normal mode in whatever state was active at the time the first immediate packet was presented.

Because of the simultaneous operation of a transmitter state machine and a receiver state machine at the two ends of each direction of each session, packets relating to normal priority activities may arrive at a transmitter state machine while processing of an immediate packet is in progress. These receptions are handled based on the state of the normal mode transmitter, although no other normal mode operations occur until immediate mode processing has been completed.

The transmitter state machine expects positive acknowledgement for every immediate packet, independent of the value specified for the transmit packet count.

Several integer values are maintained by the transmitter state machine to track message sequence and detect missing and/or duplicated packets. These include n, which represents the current sequence number used for transmission of normal priority packets;

m, which represents the highest (normal priority) message sequence number for which the corresponding receiver state machine has acknowledged successful reception;

p, which represents the current sequence number used for transmission of immediate packets;

t, which represents the transmit packet count in use for this direction of the active session; and x, which represents a value in the range 0 to 15.

All magnitude relationships between these numbers are implemented such that the wrap-around from 15 to 0 appears to be an increase in magnitude. This is unambiguous because t must be less than 16.

The transmitter state machine indicates its state transitions using an operation code and sequence number in the transmitter status byte (TXSB) of each packet it sends. Permissible operations include DATAIn, indicating that this packet contains byte stream and/or administrative data and that this packet is an initial or intermediate packet in a group of two or more packets being transmitted without positive acknowledgement;

DATAFn, indicating that this packet contains byte stream and/or administrative data, that this packet is the final (or only) packet in a group, and that positive acknowledgement is required;

IDLEn, indicating that no further data is currently (temporarily) available after data packet "n−1";

NOPx, used for keep-alive messages (sequence number is ignored);

CONTROL COMMAND, used for functions such as Connect, Disconnect, Report Device Parameters, etc. (sequence numbering not used); and CONTROL REPLY, used to send completion codes and reply data in response to CONTROL COMMANDs (sequence numbering not used).

The events which can cause state transitions in the transmitter state machine include "READYn+1", which denotes receipt of a packet whose receiver status byte contains acknowledgement type READYn+1, indicating that the receiver has successfully received all packets transmitted up through DATAFn, and that the receiver has sufficient buffers available for a group of packets the length of the active transmit packet count;

"BUSYn+1", which denotes receipt of a packet whose receiver status byte contains acknowledgement type BUSYn+1, indicating that the receiver has successfully received all packets transmitted up through DATAFn, but that the receiver currently has no additional buffers available (or an insufficient number of buffers to accept a group of packets the length of the active transmit packet count);

"READYm+1", which denotes receipt of a packet whose receiver status byte contains acknowledgement type READYm+1, indicating that the receiver state machine has successfully received all packets transmitted up through DATAFm, has not successfully received the packet transmitted with sequence number m+1, and that a retry of packet "m" (and subsequent) transmission(s) is necessary;

"Nothing Sent, Data Available", indicating that one or more new outgoing packets have been presented for transmission at a time when no data packets have been sent since the last "READYn+I", "READYm+1", or "T1" event;

"DATAIn Sent, More Data Available", indicating that one or more additional outgoing packets are awaiting transmission at a time when at least one DATAIn packet has been sent since the last "READYn+1", "READYm+1", or "T1" event;

"T1", which denotes expiration of the timeout interval relating to retries and keep-alives, this timeout is reset each time any packet is transmitted to the session partner; and "T2", which denotes expiration of the timeout interval relating to loss of communication or protocol violation, this timeout is reset each time any valid packet is received from the session partner.

Due to a variety of situations, including a previous attempt to transmit a packet to a device whose RIM receiver is inhibited, there can be cases where there is a need for a transmitter state machine to send a packet when its RIM transmitter is busy. When this occurs the transmitter state machine temporarily ceases handling all events shown in its state transition table, with the exception of the "T2" timeout event. After the transmitter has become available, and been re-enabled to send the waiting transmission, any events which arrived during the period which the transmitter was busy are processed. Processing of received "NOPx" packets (to reset T2) is also deferred during periods when the transmitter is busy.

Operation of the transmitter state machine in normal mode is characterized by the table shown in FIG. 15. For each box in the body of the table, items in capital letters indicate transmissions of packets with the indicated function in the transmitter status bytes, items in lowercase letters indicate internal operations within the transmitter state machine, and items beginning with a right arrow indicate the state entered upon completion of the activities in the box.

Other operational characteristics of the transmitter state machine are as follows. If more than one event occurs simultaneously, the event shown in the left-most column of the table is handled first. Other events are only handled if they are still true after the initial event is handled. The T1 timeout interval varies with transmitter state as shown, the T2 timeout interval is always a fixed value greater than T1. Receipt of any receiver status message of "NOPx" (regardless of sequence number) causes the T2 timer to be reset, but is otherwise ignored by the transmitter state machine. Transmission of a CONTROL COMMAND or a CONTROL REPLY may take place wherever "DATAFn" appears. No further transmissions take place after sending a CONTROL COMMAND until the corresponding CONTROL REPLY is received. If the T1 time interval expires while waiting for this CONTROL REPLY, the CONTROL COMMAND is re-transmitted. No acknowledgement is expected, nor required, for each CONTROL REPLY. If the T2 time interval elapses without receiving a CONTROL REPLY, the CONTROL COMMAND activity (and the session, if any) is terminated. All packets received from the session partner with receiver status values other than those covered by the events defined in the state transition table are ignored by the transmitter state machine without resetting the T2 timer. This results in timeout-based session termination due to protocol violations. There are also error conditions shown on the state transition table which specify that the T2 timer should not reset. Upon the establishment of a session, or upon resynchronization, the transmitter state machine enters state TS with n:=m:=−1.

Operation of the transmitter state machine in immediate mode is characterized by the table shown in FIG. 16. For each box in the body of this table items in capital letters indicate transmissions of packets with the indicated function in the transmitter status bytes, items in lowercase letter indicate internal operations within the transmitter state machine, items beginning with a right arrow indicate the state entered upon completion of the activities in the box, and the designation "Tx" refers to the normal mode state (TA, TW, or TS) which is appropriate to enter upon termination of immediate mode operation.

Other operational characteristics of the transmitter state machine in immediate mode are as follows. The T1 timeout interval varies with transmitter state as shown, the T2 timeout interval is always a fixed value greater than T1. These T1 and T2 timers are the same ones used with the normal mode transmitter state machine. Receipt of any receiver status message of "NOPx" (regardless of sequence number) is causes the T2 timer to be reset, but is otherwise ignored by the transmitter state machine. Transmission of a CONTROL COMMAND or a CONTROL REPLY may take place wherever "DATAFp" appears. No further transmissions take place after sending a CONTROL COMMAND until the corresponding CONTROL REPLY is received If the T1 time interval expires while waiting for this CONTROL REPLY the CONTROL COMMAND is re-transmitted. No acknowledgement is expected, nor required, for each CONTROL REPLY. If the T2 time interval elapses without receiving a CONTROL REPLY the CONTROL COMMAND activity, the session, if any, is terminated. All packets received from the session partner with receiver status values other than those covered by the events defined in the state transition table are ignored by the transmitter state machine without resetting the T2 timer. This results in timeout-based session termination due to protocol violations. There are also error conditions shown on the state transition table which specify that the T2 timer should not reset. Upon establishment of a session, or upon resynchronization, the value of p is initialized to zero. Upon entry to immediate mode, the transmitter state machine sends a DATAFp packet and enters ITA state. The value of p used for this DATAFp packet is unchanged from the previous exit from immediate mode (or resynchronization).

The receiver state machine handles all incoming packets for a given Device, provides the receiver status byte RXSB for incorporation in all outgoing packets from this Device; generates sequence numbers for outgoing acknowledgements; retransmits free buffer available indications if no new packets are received within a timeout interval; generates keep-alive packets at predetermined time intervals when no free buffers are available; and breaks the connection if more than a greater second predetermined time period elapses without a status reply from the corresponding transmitter state machine.

The normal mode receiver states are shown in FIG. 17. The receiver states are Receiver Active (RA), entered when there are one or more receive buffers available; Receiver Waiting (RW), entered when no receive buffers are available; and Receiver Stopped (RS), entered when the transmitter has halted communication because it has no outgoing data to send.

The reception of normal packets and of immediate packets are treated as independent activities. There is a semi-independent receiver state for immediate packets, using IRA and IRW receiver states. After reset, as well as when no immediate packets have been received and not yet been acknowledged, the receiver state machine is in normal mode, and uses states RA, RW, and RS. When an immediate packet is received while in normal mode the receiver state machine enters immediate mode with IRA state and acknowledges the packet. Once immediate mode is entered the receiver state machine remains in immediate mode (states IRA and IRW) until the received immediate packet has been acknowledged. At this time the receiver state machine returns to normal mode in whatever state was active at the time the first immediate packet was received. Because of the simultaneous operation of a transmitter state machine and a receiver state machine at the two ends of each direction of each session, packets relating to normal priority activities may arrive at a receiver state machine while processing of an immediate packet is in progress. These receptions are handled based on the state of the normal mode receiver, although no other normal mode operations occur until immediate mode processing has been completed. This implies that there must be at least one (generally exactly one) receive buffer available when the normal mode receiver enters RW state.

The receiver state machine generates positive acknowledgement for every immediate packet, independent of the value specified for the transmit packet count.

Several integer values are maintained by the receiver state machine to track message sequence and detect missing and/or duplicated packets. These include n, which represents the current sequence number used for normal priority reception;

m, which represents a sequence number, associated with a received normal priority packet, which may be earlier in sequence than n, but is within the range of the active transmit packet count. When $t=1$ then $m=(n-1)$, when t is greater than 1 then (n-t) is less than m is less than or equal to $(n-1)$;

p, which represents the current sequence number used for immediate packet reception;

t, which represents the transmit packet count in use for this direction of the active session; and x, which represents a value in the range of 0 to 15.

All magnitude relationships between these numbers are implemented such that the wrap-around from 15 to 0 appears to be an increase in magnitude. This is unambiguous because t must be less than 16.

The receiver state machine indicates its state transitions using an acknowledgement code and sequence number in the receiver status byte of each packet it sends. Permissible acknowledgements include READYn, indicating that the receiver has successfully received all packets up through "n−1" and is capable of accepting at least the number of packets allowed by the transmit packet count;

BUSYn, indicating that the receiver has successfully received all packets up through "n−1" but currently (temporarily) has insufficient buffers available to receive the number of packets allowed by the transmit packet count; and NOPx, used for keep-alive messages (sequence number ignored).

The events which can cause state transitions in the receiver state machine include "DATFn", which denotes receipt of a packet whose transmitter status byte contains function type DATAFn, indicating arrival of the next expected sequence value on the last (or only) data packet in a group of packets for which positive acknowledgement is needed;

"IDLEn", which denotes receipt of a packet whose transmitter status byte contains function type IDLEn, indicating that the transmitter currently has no additional data to send;

"DATAFm", which denotes receipt of a packet whose transmitter status byte contains function type DATAFm, indicating that the transmitter state machine has not successfully received the last acknowledgement to a data packet and that a retry of that transmission (and subsequent transmissions) is occurring; (When t=1, m=(n−1), so DATAFm is equivalent to DATAFn−1.)

"DATAIn", which denotes receipt of a packet whose transmitter status byte contains function type DATAIn, indicating arrival of the next expected sequence value on an initial or intermediate data packet in a group of data packets for which acknowledgement will be generated after the entire group is received (as will be indicated by receipt of a packet with function type DATAFn); If the number of DATAIn events since the last DATAFn event exceeds the active transmit packet count minus 1, receipt of DATAIn packet is ignored.

"t Receive Buffers Available", indicating that at least "t" free receiver packet buffers have become available after a condition where less than "t" free receiver buffers had been available;

"T3", which denotes expiration of the timeout interval relating to retries and keep-alives, this timeout is reset each time any packet is transmitted to the session partner; and "T2", which denotes expiration of the timeout interval relating to lost communication or protocol violation, this timeout is reset each time any valid packet is received from the session partner.

Operation of the receiver state machine in normal mode is characterized by the table shown in FIG. 17. For each box in the body of the table items in capital letters indicate transmissions of packets with the indicated function in the receiver status bytes, items in lowercase letters indicate internal operations within the receiver state machine, and items beginning with a right arrow indicate the state entered upon completion of the activities in the box.

Other operational characteristics of the receiver state machine include: If more than one event is pending simultaneously, the one which appears the left-most column of the table is processed fully before any consideration is given to the one(s) further to the right. In most cases processing the left-most event will cause other events to no longer be pending when such processing is completed. Receipt of a CONTROL COMMAND or CONTROL REPLY packet causes the receiver state machine to reset the T2 timer and to pass the packet to the control function processing facilities of the device. The receiver state machine takes no other action, and does not acknowledge CONTROL COMMANDs or each CONTROL REPLY. The T3 timeout interval varies with receiver state as shown, the T2 timeout interval is always a fixed time. Receipt of any transmitter status message of "NOPx" (regardless of sequence number) causes the T2 timer to be reset, but is otherwise ignored by the receiver state machine. All received packets from the session partner with transmitter status other than those covered by the defined events are ignored by the receiver state machine without resetting the T2 timer. This will invoke timeout-based recovery on protocol violations. There are also error conditions shown on the state transition table which specify that the T2 timer is not to be reset. Upon reset, or establishment of a session, the receiver state machine enters state RW with n:=0.

Operation of the receiver state machine in immediate mode is characterized by the table shown in FIG. 18. For each box in the body of the table items in capital letters indicate transmissions of packets with the indicated function in the receiver status bytes, items in lowercase letters indicate internal operations within the receiver state machine, items beginning with a right arrow indicate the state entered upon completion of the activities in the box, and the designation "Rx" refers to the normal mode state (RA, RW, or RS) which is appropriate to enter upon termination of immediate mode operation.

Other operational characteristics of the receiver state machine in immediate mode are as follows. Receipt of a CONTROL COMMAND or CONTROL REPLY packet causes the receiver state machine to reset the T2 timer and to pass the packet to the control function processing facilities of the device. The receiver state machine takes no other action, and does not acknowledge, CONTROL COMMANDs or each CONTROL REPLY. The T3 timeout interval varies with receiver state as shown, the T2 timeout interval is always fixed. These T3 and T2 timers are the same ones used on the normal mode receiver state machine. Receipt of any transmitter status message of "NOPx" (regardless of sequence number) causes the T2 timer to be reset, but is otherwise ignored by the receiver state machine. All received packets from the session partner with transmitter status other than those covered by the defined events are ignored by the receiver state machine without resetting the T2 timer. This will invoke timeout-based recovery on protocol violations. There are also error conditions shown on the state transition table which specify that the T2 timer is not to be reset. Upon establishment of a session or resynchronization, the receiver state machine is set inactive with p initialized to 0. Upon entry into immediate mode the receiver state machine enters IRA state with the value of p unchanged from the previous exit from immediate mode (or from resynchronization).

From the foregoing descriptions of the IONET character channel in its various aspects, including the IONET protocol and the functionality of the state machine, the significance of the improvements available from the present invention should be appreciated. This description, however, is of the presently preferred embodiment which should not be construed as limiting the scope of the invention beyond the lawful scope of the following claims.

What is claimed is:

1. In a local area network (LAN) comprising a communication medium commonly connecting a plurality of Nodes, LAN interface means at each Node for controlling access to the medium and communicating LAN packets between predetermined selected source and destination Nodes, each LAN data packet including a LAN data field and a LAN header field containing characters which control the interface means to achieve Node to Node communications in accordance with a predetermined LAN communication protocol; and in combination therewith, a character I/O channel for communicating byte stream data and control administrative information in single IONET network level data packet messages from source to destination Devices connected at the Nodes, each Device including a device interface which connects to a device which is separate from the Device, the device being one of either an I/O device which conducts I/O data transfers or a computer device including a memory and a processor means and a program code for operating the computer device, said character I/O channel comprising:

point of use (POU) means included in the Device and connected to the LAN interface means at each Node, the POU means connected to each I/O device including a microcomputer means including a memory and a program code for operating the microcomputer means;

the program codes for the processor means and the microcomputer means defining a predetermined IONET communication protocol for communicating with Devices and their connected device interfaces and devices, the IONET communication protocol being separate from the LAN communication protocol;

the POU means inserting characters in the data field of LAN data packets to form the IONET network level data packet messages which have an IONET header field and an administrative field and byte stream data field, the IONET header characters including a function code specifying one of a plurality of control functions, the administrative field characters including an administrative information code for use in accomplishing the specified control function to be performed by one of the Device or its device interface, the byte stream data characters originating from a device at the source Node; and the POU means of the destination Node directly interpreting the function code and the administrative information code characters (a) to establish a session between the source and destination Devices for communicating IONET data packet messages therebetween without acceptance of and interference from other IONET data packet messages for the duration of the session, and (b) to perform a corresponding control function on one of the destination Device or its device interface during the session, while (c) simultaneously transferring the byte stream data characters in unmodified form directly to the device connected to the device interface of the destination Device.

2. An invention as defined in claim 1 wherein one control function is a disconnect control function which terminates an established session.

3. An invention as defined in claim 1 wherein the IONET header characters include a length code specifying an arbitrary length for each of the administrative and byte stream data fields.

4. An invention as defined in claim 1 wherein the IONET header characters include an immediate code, and the POU means of the destination Device immediately performs the control function specified by the function code and the administrative information code upon receipt of the IONET message containing the immediate code.

5. An invention as defined in claim 1 wherein the LAN interface means inserts source Node identifying information in each LAN data packet, and wherein:

the microcomputer means of one POU means prohibits the responsive communication of IONET messages to a Device connected at a Node which has identifying information which does not correspond to the Node identifying information of the Devices with which the session is established.

6. An invention as defined in claim 1 wherein the LAN interface means inserts source Node identifying information in each LAN data packet, and wherein:

the microcomputer means of one POU means includes password information identifying the source Node of each Device capable of initiating a session with the Device of the one POU means, and the microcomputer means of the one POU means prohibits the communication of IONET messages unless the source information associated with the received IONET message during one half session corresponds to the source Node identifying information of the Device which supplied the password information to initiate the session.

7. An invention as defined in claim 6 wherein the microcomputer means of the one POU means further includes lock means for preventing the password information from being changed by IONET messages received from other Devices.

8. An invention as defined in claim 1 wherein an IONET message specifying a command function is followed by the communication of a reply IONET message which contains function code and an administrative information code specifying whether the requested command function has been successfully performed.

9. An invention as defined in claim 8 wherein each session is established by the communication of a first IONET message which contains a function code and an administrative information code specifying a connect control function between two Devices and by the responsive communication of a reply IONET message which contains a function code and an administrative information code specifying whether the session has been successfully established.

10. An invention as defined in claim 9 wherein each session consists of two half sessions, the first IONET message establishing one half session, and the reply IONET message establishing the other half session.

11. An invention as defined in claim 10 wherein the function code and the administrative information code of the reply IONET message are directly interpreted by one of the microcomputer means or the computer device of one Device of the established session to prohibit the communication of further IONET messages to the other Device of the established session until further IONET messages can be received in memory of the POU means of the other Device.

12. An invention as defined in claim 10 wherein:

an IONET data packet message containing multiple data packets which is communicated in one half session includes IONET header characters which specify sequential ordering information of the multiple data packets; and each other half session reply IONET message includes IONET header characters which specify acknowledgement information by which to determine those ones of data packets which were not successfully received.

13. An invention as defined in claim 12 wherein all data packets which were not successfully received are retransmitted in response to the reply IONET message containing the acknowledgement information.

14. An invention as defined in claim 12 wherein all data packets which were not successfully received are retransmitted in response to the expiration of a predetermined time period during which no reply IONET message was received.

15. An invention as defined in claim 13 wherein the reply IONET message contains characters in its IONET header which specify replies including:
successful completion of the control function;
non-support of the control function by the destination Device;
rejection by the destination Device of the control function due to the state of a receiver means at the destination Device;
rejection of the control function because the destination Device is not in session;
rejection of the control function because the destination Device is in session with another Device;
rejection of the control function because a configuration lock associated with the destination Device is set; and
rejection of the control function because there is an error in the control command character information in the control command IONET message.

16. An invention as defined in claim 8 herein the control commands specify control functions including:
report device parameters, which causes the generation of a control reply IONET message containing information relating to the type and predetermined attributes of the device connected to the Device;
report statistics, which causes the generation of a control reply IONET message containing statistics relating to medium communication;
report interface parameters, which causes the generation of a control reply IONET message relating to the interface control and related modal state of the Device;
set device parameters, which causes the one Device to store new parameter information regarding the other Device of the session; and
set interface parameters, which causes the destination Device to set new values for interface control and the related modal state.

17. An invention as defined in claim 8 wherein the control functions include:
flush buffers, which causes all previous information communicated in IONET messages to the memory of the recipient Device to be discarded;
run extended diagnostics, which causes the Device to perform diagnostic functions and report on the results of those functions; and
report status, which causes the Device to generate a control reply IONET message describing the status of an device interface of the device.

18. An invention as defined in claim 8 wherein the reply IONET messages include information specifying:
the state of the device interface input signals and an indication of generic power on/off and generic ready/not-ready status;
selection of those input status changes which result in communicating control reply IONET messages containing status information; and
specification of settings of device interface output control signals.

19. An invention as defined in claim 1 wherein the control commands for the device interface include:
a command to transfer the data packet message;
a command to stop receiving data packet messages; and
a command for communicating keep alive messages to maintain the session in the absence of communicated data packet messages.

20. For use with a local area network (LAN) comprising a communication medium commonly connecting a plurality of Nodes, LAN interface means at each Node for controlling access to the medium and communicating LAN packets between predetermined selected source and destination Nodes, each LAN data packet including a LAN data field and a LAN header field containing characters which control the interface means to achieve Node to Node communications in accordance with a predetermined LAN communication protocol;
a method for communicating byte stream data and control administrative information in single IONET network level data packet messages from source to destination Devices connected at the Nodes by communicating LAN data packets between source and destination odes in accordance with the LAN communication protocol, each Device including a device interface which connects to a device which is separate from the Device, the device being one of either an I/O device which conducts I/O data transfers or a computer device including a memory and a processor means and a program code for operating the computer device, said method being useful for communicating characters as an I/O channel and comprising:
including a point of use (POU) means in the Device and connecting the POU means to the LAN interface means at each Node;
including a microcomputer means including a memory and a program code for operating the microcomputer means in each POU means;
implementing an IONET communication protocol separately from the LAN communication protocol in the program codes of each computer device and microcomputer means, and thereby:
forming the IONET network level data packet messages in accordance with the IONET communication protocol by inserting characters in the LAN data field of each LAN data packet communicated between the Nodes;
forming an IONET header field and an administrative field and a byte stream data field in each IONET data packet message by the inserted characters, the IONET header characters including a function code specifying one of a plurality of control functions, the administrative field characters including an administrative information code for use in accomplishing the specified control function to be performed by the one of Device or its device interface, the byte stream data characters originating from a device at the source Node; and
directly interpreting the function code and administrative information code characters at the destination Node in accordance with the IONET communication protocol, and thereby (a) establishing a session between the source and destination Devices for communicating IONET data packet messages therebetween without acceptance of and interference from other IONET data packet messages for the duration of the session, and (b) performing a corresponding control function on one of the destination Device or its device interface during the session, while (c) simultaneously transferring the byte stream data characters in unmodified form directly to the device connected to the device interface of the destination Device.

21. A method as defined in claim 20 further comprising:
   establishing a session to communicate byte stream data in IONET messages, each session consisting of two half sessions;
   communicating a first IONET message from a first Device to a second Device in one half session; and
   communicating a reply IONET message from the second Device to the first device in the other half session.

22. A method as defined in claim 21 further comprising:
   communicating status information regarding the present and previous half sessions with each reply IONET message.

23. A method as defined in claim 21 further comprising:
   communicating an IONET message to maintain the continuance of an established session when byte stream data is unavailable to communicate by IONET data packet messages.

24. A method as defined in claim 21 further comprising:
   interpreting the function code and administrative information code and performing a corresponding control function on one of the Device or device interface while the session is established; and
   communicating a reply IONET message to indicate whether the control function was successfully accomplished.

25. A method as defined in claim 21 further comprising:
   including ordering information in an IONET data packet message of one half session which specifies the sequential order of multiple data packets; and
   acknowledging in a replay IONET message in the other half session those ones of the data packets which have been unsuccessfully received.

26. A method as defined in claim 25 further comprising:
   retransmitting those ones of the data packets which have been acknowledged as unsuccessfully received.

27. A method as defined in claim 21 further comprising:
   retransmitting IONET data packet messages which have been previously transmitted after the expiration of a predetermined time period after which a reply IONET message acknowledging the successful receipt of those messages has not been received.

28. A method as defined in claim 20 further comprising:
   establishing a session between only those Devices which are preselected to allow communication of IONET messages therebetween.

29. A method as defined in claim 20 further comprising:
   dividing the administrative and byte stream data fields of each IONET message into arbitrary lengths, either of which may contain no information; and
   specifying the length of each of the administrative and byte stream data fields by inserting characters in the IONET header field which form a length code.

30. A method as defined in claim 20 further comprising:
   communicating multiple IONET data packet messages; and
   limiting the number of IONET data packet messages communicated in a group to a number which is at least one less than the number of IONET data packet messages which can be received in the memory of a destination Device without inhibiting a receiver means of a destination Node.

* * * * *